US012665854B2

(12) United States Patent
Nesteroff et al.

(10) Patent No.: US 12,665,854 B2
(45) Date of Patent: Jun. 23, 2026

(54) CONFLICT MANAGEMENT OF FUNCTIONS AND SERVICES IN A RADIO INTELLIGENT CONTROLLER USER INTERFACE

(71) Applicant: Juniper Networks, Inc., Sunnyvale, CA (US)

(72) Inventors: Lyubov Nesteroff, Pleasant Hill, CA (US); Arda Akman, San Ramon, CA (US); Burcu Sahin, Ankara (TR); Tugba Arici, Ankara (TR)

(73) Assignee: Hewlett Packard Enterprise Development LP, Spring, TX (US)

( * ) Notice: Subject to any disclaimer, the term of this patent is extended or adjusted under 35 U.S.C. 154(b) by 31 days.

(21) Appl. No.: 18/529,448

(22) Filed: Dec. 5, 2023

(65) Prior Publication Data

US 2025/0184278 A1     Jun. 5, 2025

(51) Int. Cl.
*H04L 47/2475* (2022.01)

(52) U.S. Cl.
CPC ................................. *H04L 47/2475* (2013.01)

(58) Field of Classification Search
CPC ... H04L 9/50; H04L 67/1097; H04L 2209/56; H04L 63/1441; H04L 67/34; H04L 9/3239; H04L 67/02; H04L 67/125; H04L 67/52; H04L 67/60; H04L 41/0894; H04L 63/20; H04L 2463/101; H04L 2463/102; H04L 63/00; H04L 63/04; H04L 63/104; H04L 41/5019; H04L 47/20; H04L 41/0895; H04L 41/40; H04L 41/5009;
(Continued)

(56) References Cited

U.S. PATENT DOCUMENTS

2022/0038902 A1 * 2/2022 Mueck ................ H04L 63/1433
2023/0129575 A1 * 4/2023 Chou .................... H04W 24/02
370/329
(Continued)

FOREIGN PATENT DOCUMENTS

EP          4250640 A1      9/2023
WO     2023091664 A1      5/2023

OTHER PUBLICATIONS

"3rd Generation Partnership Project; Technical Specification Group Services and System Aspects; System architecture for the 5G System (5GS); Stage 2 (Release 17)" 3GPP, Mar. 2021, 489 pp.
(Continued)

*Primary Examiner* — Djenane M Bayard
(74) *Attorney, Agent, or Firm* — Shumaker & Sieffert P.A.

(57) ABSTRACT

Conflict management of functions and services (e.g., RAN intelligent controller (RIC) may be performed by displaying a plurality of policies for an interface service of a radio access network (RAN); receiving an indication of selection of a conflict resolution strategy for a selected RAN interface policy type; determining whether the interface service of the RAN has a conflict based on the selected conflict resolution strategy for the selected RAN interface policy type; when the interface service does not have the conflict, accepting the selected conflict resolution strategy for the selected RAN interface policy type and displaying an indication of the selected conflict resolution strategy for the selected RAN interface policy type; and based on the selected conflict resolution strategy for the selected RAN interface policy type, modifying a configuration of the RAN.

19 Claims, 23 Drawing Sheets

(58) Field of Classification Search

CPC ..... H04L 45/123; H04L 45/308; H04L 45/38; H04L 67/10; H04L 41/0873; H04L 41/0893; H04L 41/16; H04L 41/5054; H04L 63/1433; H04L 63/162; H04L 1/0026; H04L 1/1812; H04L 1/1854; H04L 1/1887; H04L 2463/103; H04L 25/0226; H04L 25/0328; H04L 41/0806; H04L 41/0816; H04L 41/0823; H04L 41/0826; H04L 41/0889; H04L 41/0896; H04L 41/14; H04L 41/145; H04L 41/342; H04L 41/5022; H04L 41/5051; H04L 43/0882; H04L 43/10; H04L 47/10; H04L 43/20; H04L 43/08; H04L 43/0876; H04L 43/50; H04L 43/16; H04L 41/0631; H04L 41/147; H04L 41/22; H04L 43/0852; H04L 45/02; H04L 45/64; H04L 47/2475; H04L 12/2801; H04L 41/0266; H04L 41/04; H04L 41/0836; H04L 41/0866; H04L 41/0897; H04L 43/0858; H04L 43/106; H04L 45/24; H04L 47/2483; H04L 47/283; H04L 47/34; H04L 61/2514; H04L 61/2553; H04L 61/2578; H04L 63/101; H04L 67/30; H04L 69/14; H04L 69/18; H04L 25/0224; H04L 27/2613; H04L 41/0833; H04L 41/0886; H04L 41/122; H04L 41/142; H04L 41/28; H04L 41/5025; H04L 43/02; H04L 43/022; H04L 43/04; H04L 43/065; H04L 43/0823; H04L 43/0864; H04L 43/12; H04L 45/34; H04L 5/0007; H04L 5/0023; H04L 5/0048; H04L 5/005; H04L 5/0051; H04L 5/0053; H04L 5/0055; H04L 5/0058; H04L 63/0236; H04L 67/12; H04L 67/568; H04L 67/5681; H04L 67/61; H04L 69/22; H04L 69/324; H04L 9/3247; H04L 9/3263; H04L 9/40

See application file for complete search history.

(56) References Cited

U.S. PATENT DOCUMENTS

| | | | | |
|---|---|---|---|---|
| 2023/0344717 | A1* | 10/2023 | Cao | H04W 8/18 |
| 2024/0129799 | A1* | 4/2024 | Curic | H04W 28/0925 |
| 2024/0163649 | A1 | 5/2024 | Akman et al. | |
| 2024/0214272 | A1* | 6/2024 | Ying | H04L 41/0894 |
| 2024/0422516 | A1* | 12/2024 | Dehghan | H04W 28/16 |

OTHER PUBLICATIONS

"3rd Generation Partnership Project; Technical Specification Group Services and System Aspects; System architecture for the 5G System (5GS); Stage 2 (Release 18)" 3GPP, Jul. 2023, 694 pp.

O-RAN Alliance, "O-RAN Work Group 1 (Use Cases and Overall Architecture) O-RAN Architecture Description," version 10.00, Oct. 2023, 41 pp., URL: https://orandownloadsweb.azurewebsites.net/specifications.

O-RAN Alliance, "O-RAN Working Group 2 (Non-RT RIC and A1 interface WG) A1 interface: General Aspects and Principles," version 3.01, Oct. 2023, 21 pp., URL: https://orandownloadsweb.azurewebsites.net/specifications.

O-RAN Alliance, "O-RAN Working Group 2 (Non-RT RIC and A1 interface) A1 interface specification: Type Definitions," version 6.00, Oct. 2023, 100 pp., URL: https://orandownloadsweb.azurewebsites.net/specifications.

Adamczyk, "Challenges for Conflict Mitigation in O-RAN's RAN Intelligent Controllers", 2023 International Conference on Software, Telecommunications and Computer Networks, IEEE, Sep. 21, 2023, 6 pp.

De Oliveira et al., "An Agile Conflict-Solving Framework for Intent-Based Management of Service Level Agreement", 2023 2nd International Conference on 6G Networking, IEEE, Oct. 18, 2023, 8 pp.

Extended Search Report from counterpart European Application No. 23220680.5 dated Apr. 3, 2024, 11 pp.

Polese et al., "Understanding O-RAN: Architecture, Interfaces, Algorithms, Security, and Research Challenges", arXiv:2202.01032v1, vol. 25, No. 2, IEEE, Feb. 2, 2022, 23 pp.

Hoffmann, "How can Energy Saving and TrafficSteering cooperate in O-RAN?", Rimedolabs, Apr. 15, 2024, 5 pp., URL: https://rimedolabs.com/blog/how-can-energy-saving-and-traffic-steering-cooperate-in-o-ran/.

Response to Extended Search Report dated Apr. 3, 2024, from counterpart European Application No. 23220680.5 filed Dec. 9, 2025, 22 pp.

* cited by examiner

900

RAN Intelligent Controller / Non Real-Time RIC  ⌄

Overview    Near Real-Time RICs    rApps    A1 Polices    Conflicts

All | 8 Clusters  ⌄  Q  ☰  🔲  💬  ⑦  Ⓐ

| Total Events 53 | Conflicts Detected ◇ 21 | Conflicts Allowed ⊘ 18 | Conflicts Blocked ⊘ 3 | Conflicts Guided 🔲 32 |

⌄ ☑ List of Events ~816

Last update: 12/08/2023, 4:30:20 AM PDT | Total Events 225

More ⌄ | ≡ ⌄ | ⋮

| ☐ | Events Type _902~_ | Source rApp _906~_ | Rule ID _908~_ | Outcome _910~_ | Description _912~_ | Time Raised _904~_ |
|---|---|---|---|---|---|---|
| ☐ | A1-P Guidance Request | trafficsteering | 3 | - | A1-P conflict guidance request... | Aug 7, 2023, 8:14:27 AM |
| ☐ | A1-P Guidance Response | trafficsteering | 3 | Guided | A1-P conflict guidance respon... | Aug 7, 2023, 8:14:28 AM |
| ☐ | A1-P Conflict Detection | trafficsteering | 7 | - | Detected an A1-P conflict | Aug 7, 2023, 8:14:37 AM |
| ☐ | A1-P Conflict Resolution | rsslaa | 7 | Blocked | Resolved the A1-P conflict | Aug 7, 2023, 4:30:39 AM |
| ☐ | A1-P Conflict Detection | rsslaa | 7 | - | Detected an A1-P conflict | Aug 7, 2023, 4:30:15 AM |
| ☐ | A1-P Conflict Resolution | admissioncontrol | 7 | Allowed | Resolved the A1-P conflict | Aug 7, 2023, 4:30:15 AM |
| ☐ | A1-P Guidance Response | admissioncontrol | 7 | Guided | Detected an A1-P conflict | Aug 7, 2023, 8:14:20 AM |
| ☐ | A1-P Conflict Detection | rsslaa | 3 | - | Resolved the A1-P conflict | Aug 7, 2023, 8:14:21 AM |
| ☐ | A1-P Conflict Resolution | rsslaa | 3 | Blocked | Detected an A1-P conflict | Aug 7, 2023, 8:14:32 AM |
| ☐ | A1-P Conflict Detection | admissioncontrol | 7 | - | Resolved the A1-P conflict | Aug 7, 2023, 4:30:30 AM |
| ☐ | A1-P Conflict Resolution | admissioncontrol | 7 | Allowed | Resolved the A1-P conflict | Aug 7, 2023, 4:30:10 AM |

250 items ↻

< 1 of 8 > Show  8 Rows ⌄

Last update: 12/08/2023, by LSkywalker | Total Rules 18

⌄ Conflict Settings

FIG. 9

SMO|RIC

Figure 10:
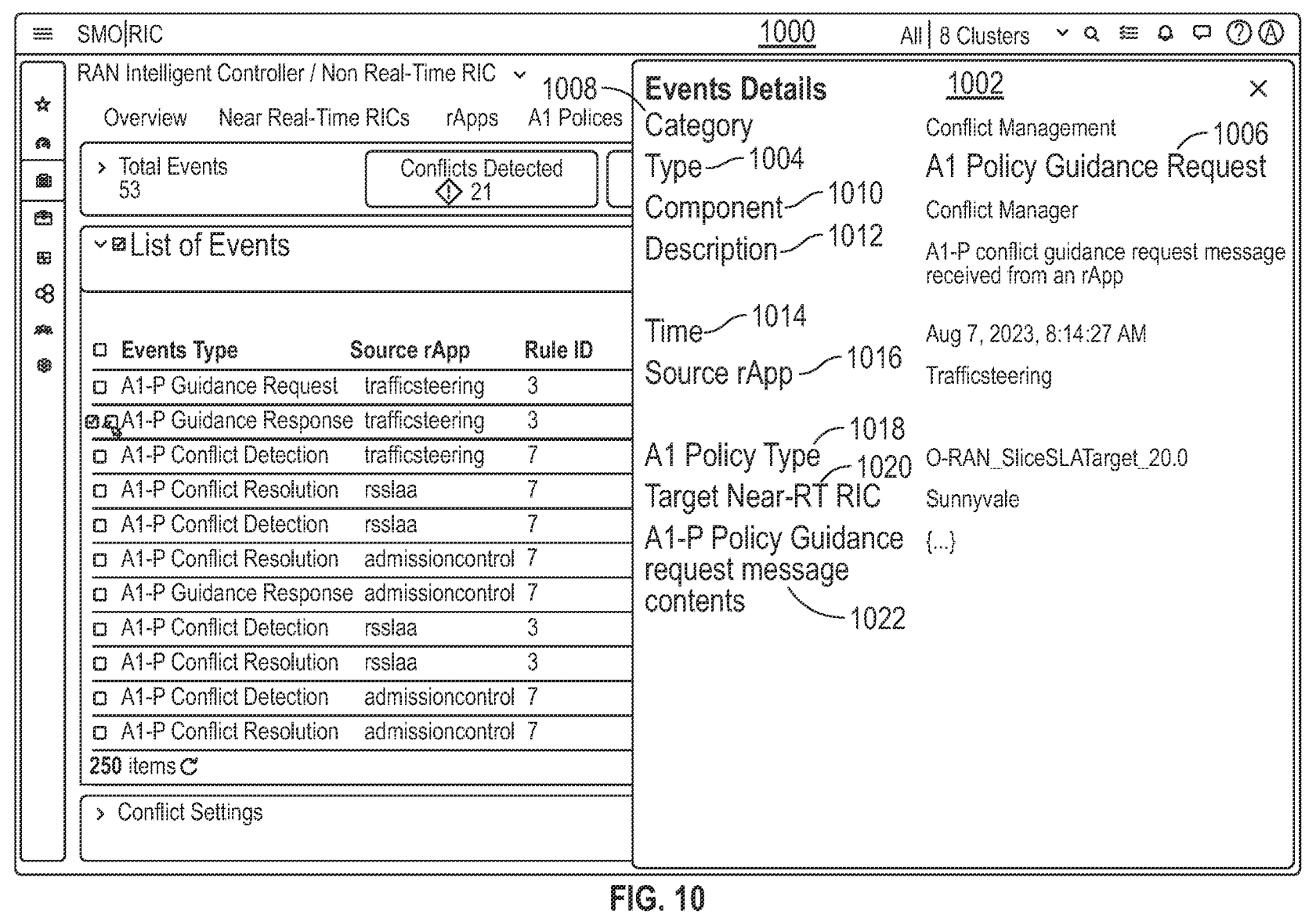

SMO|RIC

RAN Intelligent Controller / Non Real-Time RIC ∨ 1008

Overview   Near Real-Time RICs   rApps   A1 Polices

> Total Events
53

Conflicts Detected
◇ 21

∨ ☑ List of Events

| ☐ Events Type | Source rApp | Rule ID |
|---|---|---|
| ☐ A1-P Guidance Request | trafficsteering | 3 |
| ☑ A1-P Guidance Response | trafficsteering | 3 |
| ☐ A1-P Conflict Detection | trafficsteering | 7 |
| ☐ A1-P Conflict Resolution | rsslaa | 7 |
| ☐ A1-P Conflict Detection | rsslaa | 7 |
| ☐ A1-P Conflict Resolution | admissioncontrol | 7 |
| ☐ A1-P Guidance Response | admissioncontrol | 7 |
| ☐ A1-P Conflict Detection | rsslaa | 3 |
| ☐ A1-P Conflict Resolution | rsslaa | 3 |
| ☐ A1-P Conflict Detection | admissioncontrol | 7 |
| ☐ A1-P Conflict Resolution | admissioncontrol | 7 |

250 items ↻

> Conflict Settings

All | 8 Clusters   ∨   ♀   ⊞   ≡   ♀   ▢   ⑦ Ⓐ

1000

Events Details   1002   ✕

Category   Conflict Management

Type ⌐ 1004   A1 Policy Guidance Request ⌐ 1006

Component ⌐ 1010   Conflict Manager

Description ⌐ 1012   A1-P conflict guidance request message received from an rApp Time ⌐ 1014   Aug 7, 2023, 8:14:27 AM Source rApp ⌐ 1016   Trafficsteering A1 Policy Type ⌐ 1018   O-RAN_SliceSLATarget_20.0

Target Near-RT RIC ⌐ 1020   Sunnyvale

A1-P Policy Guidance request message contents ⌐ 1022   {...}

Figure 14:
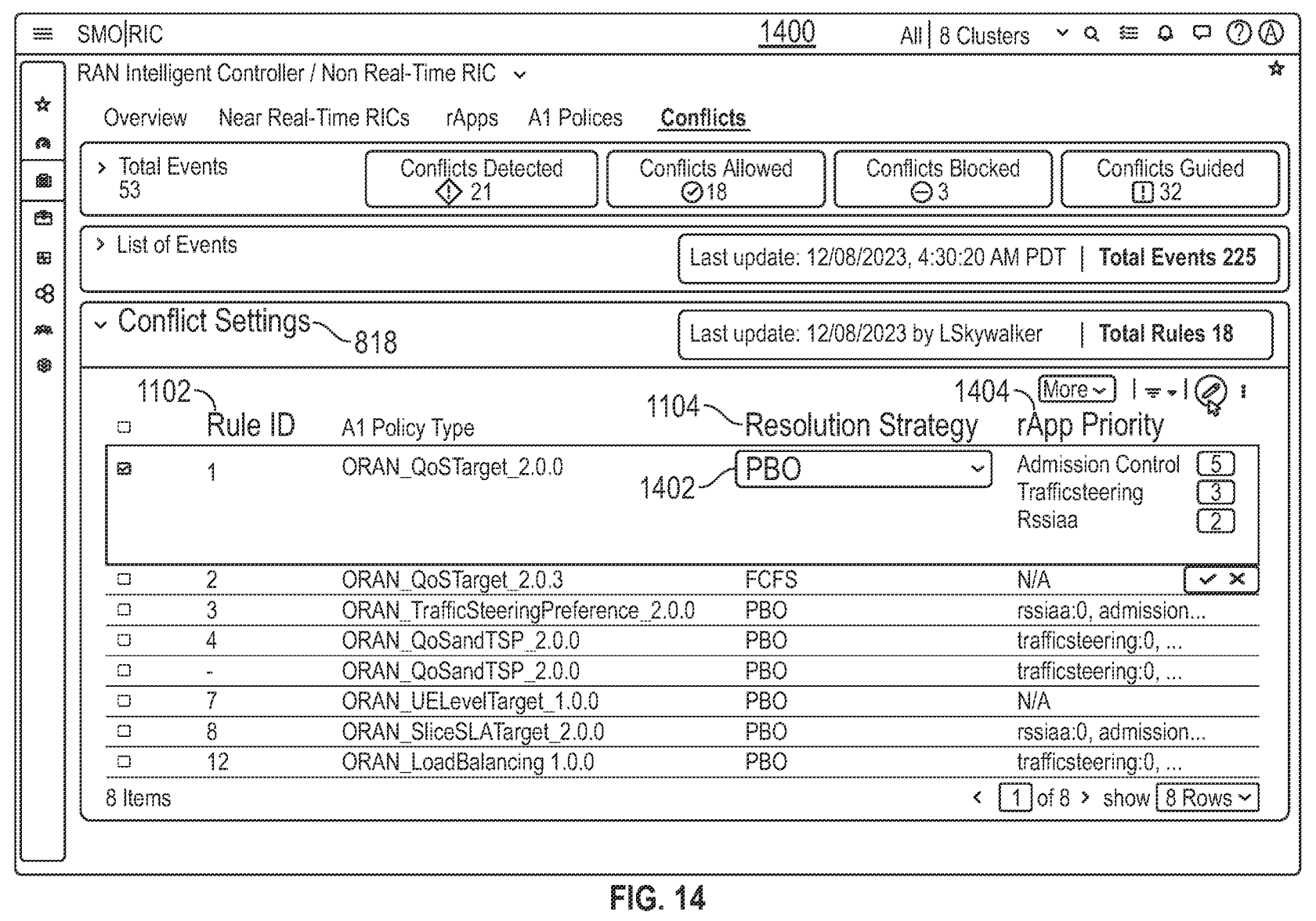

SMO|RIC

RAN Intelligent Controller / Non Real-Time RIC ⌄

Overview   Near Real-Time RICs   rApps   A1 Polices   Conflicts

All | 8 Clusters   ⌄ Q ≣ ▢ Q ▢ ⑦ Ⓐ

| ⌄ Total Events | Conflicts Detected | Conflicts Allowed | Conflicts Blocked | Conflicts Guided |
|---|---|---|---|---|
| 53 | ◇ 21 | ⊙ 18 | ⊖ 3 | ▢ 32 |

> List of Events

Last update: 12/08/2023, 4:30:20 AM PDT | Total Events 225

⌄ Conflict Settings ⌐818

Last update: 12/08/2023 by LSkywalker    | Total Rules 18

1102⌐    1104⌐ Resolution Strategy    1404⌐ More ⌄ | ⇥ ⌄ | ⊙ ⚙ ⦂ rApp Priority

| ☐ | Rule ID | A1 Policy Type | | |
|---|---|---|---|---|
| ☑ | 1 | ORAN_QoSTarget_2.0.0 | PBO ⌄ 1402 | Admission Control  5 |
| | | | | Trafficsteering  3 |
| | | | | Rssiaa  2 |
| | | | | ✓ ✕ |
| ☐ | 2 | ORAN_QoSTarget_2.0.3 | FCFS | N/A |
| ☐ | 3 | ORAN_TrafficSteeringPreference_2.0.0 | PBO | rssiaa:0, admission... |
| ☐ | 4 | ORAN_QoSandTSP_2.0.0 | PBO | trafficsteering:0, ... |
| ☐ | - | ORAN_QoSandTSP_2.0.0 | PBO | trafficsteering:0, ... |
| ☐ | 7 | ORAN_UELevelTarget_1.0.0 | PBO | N/A |
| ☐ | 8 | ORAN_SliceSLATarget_2.0.0 | PBO | rssiaa:0, admission... |
| ☐ | 12 | ORAN_LoadBalancing 1.0.0 | PBO | trafficsteering:0, ... |

8 Items                    ⌄   ◁ [1] of 8 ▷ show 8 Rows ⌄

CONFLICT MANAGEMENT OF FUNCTIONS AND SERVICES IN A RADIO INTELLIGENT CONTROLLER USER INTERFACE

TECHNICAL FIELD

The disclosure relates to computer networking and, more specifically, to conflict management of functions and services with a radio intelligent controller.

BACKGROUND

Computer networks have become ubiquitous, and the number of network applications, network-connected devices, and types of network-connected devices are rapidly expanding. Such devices now include computers, smartphones, Internet-of-Things (IoT) devices, vehicles, medical devices factory equipment, etc. 5G mobile network architectures enhanced the ability to provide communication services using cloud-based network function virtualization (NFV). Specialized networks can be created using the Radio Access Network (RAN) of a mobile network operator combined with functions of a 5G core. For example, networks can be created for a specific service level agreement (SLA), special use cases, or other specific requirements. Examples of such networks include private mobile networks, industrial networks, a dedicated network for connected vehicles, etc.

SUMMARY

In general, the disclosure describes techniques for conflict management of functions and services in a user interface (UI), for example, of a RAN Intelligent Controller (RIC) for a RAN of a mobile network. For example, a network system may include a Service Management and Orchestration (SMO) framework offering various framework functions along with a non-real-time (non-RT) RIC, configured in accordance with Open Radio Access Network (O-RAN) standards ("O-RAN architecture"), to manage and/or monitor aspects of a RAN and/or 5G core. The O-RAN architecture may include a non-RT RIC and a near-real-time RIC (near-RT RIC) that each executes different functions and services for RAN functions. For example, the non-RT RIC is an orchestration and automation function configured to provide radio resource management, higher layer procedure optimization, policy optimization, and provide guidance, parameters, policies and AI/ML models to support the operation of near-RT RIC functions in the RAN. The non-RT RIC may onboard one or more applications (e.g., rApps) that provide non-real time (e.g., greater than one second) control of RAN elements and their resources, and the near-RT RIC may onboard one or more applications (e.g., xApps) that provide near-real time control of RAN elements and their resources. The O-RAN architecture includes several interfaces, such as A1, O1, and O2 interfaces, that are each used to provide the functions and services by which the SMO and RIC can configure or direct other components of the RAN. For example, the functions and services of a non-RT RIC may include policy management services and/or enrichment information services for a near-RT RIC that are provided over an A1 interface (collectively referred to herein as "A1 services" because they provided over the A1 interface); performance management services, configuration management services, and/or Operations, Administration, and Management (OAM) services for O-RAN management elements that are provided over an O1 interface (referred to herein as "O1 services" because they are provided over the O1 interface); configuration management services and performance management services for resources of an O-RAN cloud that are provided over an O2 interface (referred to herein as "O2 services" because they are provided over the O2 interface), and/or other services, such as service management and exposure (SME) services (e.g., registration of a service, update of a service registration), data management and exposure (DME) services, and/or AI/ML services. According to the techniques disclosed herein, the non-RT RIC may include one or more microservices configured to provide conflict management for these functions and services.

In accordance with the techniques of this disclosure, the non-RT RIC may provide conflict management of policies for A1 services. For example, a conflict manager of the non-RT RIC may receive a request from an application to perform an A1 service (e.g., create or update a policy of the application) and determine whether the A1 service has a conflict due to the policy. Based on the determination of whether the A1 service has a conflict, the non-RT RIC may perform an action to address the conflict (e.g., by implementing (or not implementing) the policy of the application based on conflict management rules). In some examples, the non-RT RIC may provide conflict management of policies for O1 services. For example, the conflict manager of the non-RT RIC may receive a request from an application to perform an O1 service (e.g., implement configuration changes of RAN elements, create a performance job, etc.) and determine whether the O1 service has a conflict. Based on the determination of whether the O1 service has a conflict, the non-RT RIC may perform an action to address the conflict (e.g., by implementing (or not implementing) the configuration changes based on conflict management rules). In some examples, the non-RT RIC may provide conflict management for O2 services. For example, the conflict manager of the non-RT RIC may receive a request from an application to perform an O2 service (e.g., implement configuration changes of resources of the O-RAN cloud) and determine whether the O2 service has a conflict. Based on the determination of whether the O2 service has a conflict, the non-RT RIC may perform an action to address the conflict (e.g., by implementing (or not implementing) the configuration based on conflict management rules). In some examples, the non-RT RIC may provide conflict management for policies of other services, such as SME services (e.g., registration of service, update of service registration), DME services, and/or AL/ML services.

In accordance with the techniques of this disclosure, the conflict manager of the non-RT RIC may display to a user one or more policy conflicts and their resolution strategies on a UI of the non-RT RIC and provide a capability for the user to configure the conflict resolution strategies from the UI of the non-RT RIC.

The techniques may provide one or more technical advantages that realize at least one practical application. For example, the techniques in this disclosure may provide conflict management in a RAN and more particularly, for conflicts relating to A1, O1, or O2 services using a non-RT RIC deployed according to the O-RAN framework. Moreover, the techniques in this disclosure may provide a configurable conflict management system such that an operator may configure various settings of the conflict management system through a UI, such as the implementation of specific conflict management rules (including conflict resolution strategies). When the requested policies are configured in the RAN in accordance with conflict management strategies set by the user from the user interface as described herein, the RAN can reduce the number of conflicts and/or the impact of conflicts over resources that would otherwise occur.

In one example, the techniques include a Radio Access Network Intelligent Controller (RIC) for a radio access network (RAN), the non-RT RIC comprising processor circuitry; and a memory coupled to the processor circuitry, the memory storing instructions, when executed, to cause the processor circuitry to display a plurality of policies for an interface service of the RAN; receive an indication of selection of a conflict resolution strategy for a selected RAN interface policy type; determine whether the interface service of the RAN has a conflict based on the selected conflict resolution strategy for the selected RAN interface policy type; when the interface service does not have the conflict, accept the selected conflict resolution strategy for the selected RAN interface policy type and display an indication of the selected conflict resolution strategy for the selected RAN interface policy type; and based on the selected conflict resolution strategy for the selected RAN interface policy type, modify a configuration of the RAN.

In another example, the techniques include a method comprising displaying a plurality of policies for an interface service of a radio access network (RAN); receiving an indication of selection of a conflict resolution strategy for a selected RAN interface policy type; determining whether the interface service of the RAN has a conflict based on the selected conflict resolution strategy for the selected RAN interface policy type; when the interface service does not have the conflict, accepting the selected conflict resolution strategy for the selected RAN interface policy type and displaying an indication of the selected conflict resolution strategy for the selected RAN interface policy type; and based on the selected conflict resolution strategy for the selected RAN interface policy type, modifying a configuration of the RAN.

In another example, the techniques include non-transitory computer-readable storage media comprising instructions that, when executed, cause one or more processors of a Radio Access Network Intelligent Controller (RIC) for managing non-real time events of a radio access network (RAN) to display a plurality of policies for an interface service of the RAN; receive an indication of selection of a conflict resolution strategy for a selected RAN interface policy type; determine whether the interface service of the RAN has a conflict based on the selected conflict resolution strategy for the selected RAN interface policy type; when the interface service does not have the conflict, accept the selected conflict resolution strategy for the selected RAN interface policy type and display an indication of the selected conflict resolution strategy for the selected RAN interface policy type; and based on the selected conflict resolution strategy for the selected RAN interface policy type, modify a configuration of the RAN.

The details of one or more examples are set forth in the accompanying drawings and the description below. Other features, objects, and advantages will be apparent from the description and drawings, and from the claims.

BRIEF DESCRIPTION OF DRAWINGS

FIG. 9 is an example of a user interface displaying a list of events in accordance with the techniques described in this disclosure.

FIG. 10 is an example of a user interface displaying information about a selected event in accordance with the techniques described in this disclosure.

FIG. 11 is an example of a user interface displaying conflict settings in accordance with the techniques described in this disclosure.

FIG. 14 is another example of a user interface displaying conflict settings in accordance with the techniques described in this disclosure.

Like reference characters refer to like elements throughout the text and figures.

DETAILED DESCRIPTION

Figure 1A:
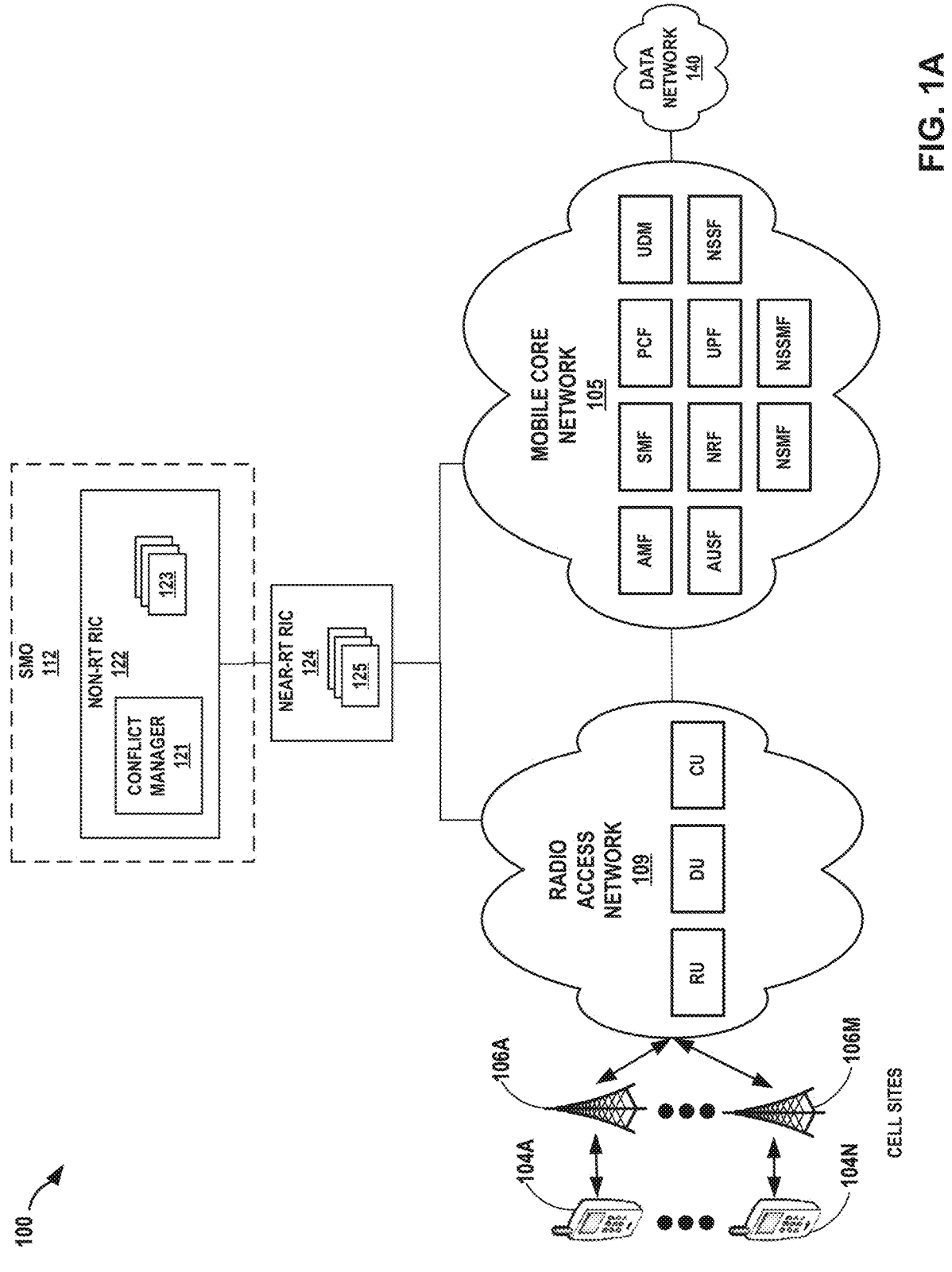
FIG. 1A is a block diagram illustrating an example network system configured to provide conflict management of functions and services of a RAN, in accordance with one or more techniques of the disclosure.

FIG. 1A is a block diagram illustrating an example network system configured to provide conflict management of functions and services of a RAN, in accordance with one or more techniques of the disclosure. In the example illustrated in FIG. 1A, network system 100 includes Service and Management Orchestrator (SMO) 112, non-RT RIC 122, near-RT RIC 124, one or more radio access networks (RANs), e.g., RAN 109, and mobile core network (or simply "core") 105 that provide user equipment 104A-104N (collectively, "UEs 104") with access to one or more applications or services provided by data network 140.

UEs 104 may represent smartphones, desktop computers, laptop computers, tablets, smart watches, and/or "Internet-of-Things" (IoT) devices, such as cameras, sensors, televisions, appliances, or the like. As shown in FIG. 1A, network system 100 includes RAN 109 that provides network access, data transport, and other services to UEs 104. In some examples, RAN 109 may be an Open Radio Access Network (O-RAN), a 5G mobile network RAN, a 4G LTE mobile network RAN, another type of RAN, or a combination of the above. For example, in a 5G-radio access network, RAN 109 comprises a plurality of cell sites (or simply "cells") that each include radio equipment, such as base stations 106A-106M (collectively, "base stations 106"), also known as gNodeBs, to exchange packetized data within a data network to ultimately access one or more applications or services provided by data network 140. Each of base stations 106 is divided into three functional components: radio unit (RU), distributed unit (DU), and central unit (CU), which can be deployed in various configurations. RU manages the radio frequency layer and has antenna arrays of various sizes and shapes. DU performs lower layer protocol processing. CU performs the upper layer protocol processing. Depending on operator and service requirements, base stations 106 can be deployed monolithically, e.g., RU, DU, and CU reside within a cell site, or these functionalities can be distributed across cell sites while the CU resides in an edge cloud site controlling a plurality of distributed DUs. O-RAN is, for example, an approach to networking in which disaggregated functions can be used to deploy mobile front-haul and mid-haul networks. The disaggregated functions can be cloud-based functions.

Radio access networks 109 connect to core 105 to exchange packets with data network 140. Core 105 may be a 5G core network, and data network (DN) 140 may represent, for example, one or more service provider networks and services, the Internet, third party services, one or more IP-VPNs, an IP-multimedia subsystem, a combination thereof, or other network or combination of networks. In some examples, resources associated with the service provided by a mobile network operator to the tenant may be provided by, or managed by, functions of core 105 and/or components of RAN 109. In some examples, core 105 implements various discrete control plane and user plane functions for network system 100. Examples of 5G control plane functions that may be provided by core 105 include Access Mobility Management Function (AMF) that provides access mobility management services, Session Management Function (SMF) that provides session management services, Policy Control Function (PCF) that provides policy control services, User Data Management (UDM) that provides management of network user data, Network Repository Function (NRF) that provides a repository that can be used to register and discover services in a network operator's network, Authentication Server Function (AUSF) that provides authentication services, Network Slice Selection Function (NSSF), Network Slice Management Function (NSMF) that may be used to select an instance of an available network slice for use by any of UE devices 104, and Network Slice Subnet Management Function (NSSMF) that provides coordination, management, and orchestration of network slice subnet instances (NSSI). Core 105 may also include User Plane Functions (UPF) that provides packet routing, forwarding and other network data processing functions (e.g., Quality of Service, packet inspection, traffic optimization etc.). Further details on services and functions provided by the 5G core can be found in 3rd Generation Partnership Project Technical Specification Group Services and System Aspects; System architecture for the 5G System (5GS); Stage 2 (Release 18), TS 23.501 V18.2.2 (2023-07), the entire contents of which is hereby incorporated by reference. Further details on the O-RAN architecture can be found in O-RAN Alliance, "O-RAN Work Group 1 (Use Cases and Overall Architecture) O-RAN Architecture Description," O-RAN.WG1.OAD-R003-v10.00, October 2023, the entire contents of which is hereby incorporated by reference.

Aspects of RAN 109 and/or core 105 may be managed and/or monitored by SMO 112, non-RT RIC 122, and near-RT RIC 124. In some examples, SMO 112, non-RT RIC 122, and near-RT RIC 124 may be operated by the mobile network operator providing 5G services to a tenant. SMO 112 can orchestrate and control management and automation aspects of RAN 109 (e.g., network slicing, management, and orchestration of O-Cloud, etc.). Further, SMO 112 may control aspects of non-RT RIC 122 and near-RT RIC 124. Non-RT RIC 122 can provide non-real-time (e.g., greater than one second) control and optimization of RAN elements and resources such as RUs, DUs, and CUs, workflow management, and policy-based control of applications and features of near-RT RIC 124. Near-RT RIC 124 can provide near-real-time (e.g., milliseconds) control and optimization of RAN elements and resources via fine-grained data collection and actions. As further described in FIG. 1B, non-RT RIC 122 and near-RT RIC 124 may deploy as a highly scalable, microservices based containerized architecture. In some examples, near-RT RIC 124 may be located within an edge or regional cloud.

Non-RT RIC 122 may onboard one or more applications, e.g., applications 123 (e.g., rApps of FIG. 1B) that manage non-real time events within non-RT RIC 122, such as applications that do not require response times of less than one second. Applications 123 may leverage the functionality exposed via the non-RT RIC framework of non-RT RIC 122. Applications 123 may be used to control and manage RAN elements and resources, such as near-RT RIC 124, RAN nodes, and/or resources in the O-RAN cloud. Applications 123 may also utilize network data, performance metrics, and subscriber data to provide recommendations for network optimization and operational guidance (e.g., policies) to one or more applications of near-RT RIC 124. Near-RT RIC 124 may onboard one or more applications, e.g., applications 125 (e.g., xApps of FIG. 2A) that manage near-real time events within near-RT RIC 124. Applications 125 may leverage the functionality exposed via the near-RT RIC framework of near-RT RIC 124. Near-RT RIC 124 may enforce policies received from applications 123 of non-RT RIC 122 and may provide policy feedback to non-RT RIC 122. Although illustrated as within non-RT RIC 122, any one or more of applications 123 may be executed by a third party, separate from non-RT RIC 122. Likewise, although illustrated as within near-RT RIC 124, any one or more of applications 125 may be executed by a third party, separate from near-RT RIC 124.

As described further below, non-RT RIC 122 may provide services using A1, O1, and O2 interfaces. An A1 interface connects the non-RT RIC 122 and near-RT RIC 124. Non-RT RIC 122 may perform services via the A1 interface, such as policy management services (e.g., creation and update of a policy), ML model management services, and/or enrichment information services. Services performed via the A1 interface are referred to herein as "A1 services." An O1 interface may include an interface that connects SMO 112 with O-RAN managed elements, such as near-RT RIC 124 and/or RAN nodes (e.g., O-RAN centralized unit (O-CU), O-RAN distributed unit (O-DU)). Non-RT RIC 122 may perform services via the O1 interface, such as configuration management services and performance management services of O-RAN managed elements (e.g., operation and maintenance (OAM) services), fault supervision, file management, heartbeat, trace, physical network function (PNF) discovery, software management, etc.). Services performed via the O1 interface are referred to herein as "O1 services." An O2 interface may include an interface that connects SMO 112 to resources of the ORAN O-Cloud. The O-Cloud may comprise of one or more physical infrastructure nodes that host O-RAN functions (e.g., virtual network functions), the supporting software components, and the appropriate management and orchestration functions. Non-RT RIC 122 may perform services via the O2 interface, such as services that provide infrastructure management and/or network function deployment of the resources in the O-Cloud (e.g., discovery and administration of O-Cloud resources; Scale-In, Scale-Out of cloud/deployments; Fault, Configuration, Accounting, Performance, and Security (FCAPS) of cloud/ deployments, software management of cloud platform/deployments; create/delete deployment and associated allocated O-Cloud resources). Services performed via the O2 interface are referred to herein as "O2 services." Non-RT RIC 122 may also perform other functions and services, such as service management and exposure (SME) services (e.g., registration of a service, update of a service registration), data management and exposure (DME) services, AI/ML services, or the like.

In some instances, functions and/or services (e.g., A1 services, O1 services, O2 services, etc.) provided by non-RT RIC 122 may be in conflict. Some conflicts may be observed directly by the framework functions (referred to herein as a "direct conflict"). For example, two or more applications 123 may request different settings for the very same parameters of a target (e.g., a first application requests for a first priority of a network slice, whereas a second application requests for a second, different priority for the same network slice). A target may be a configurable parameter, setting, object, or resource of the RAN, such as a priority, a policy, a network slice or network slice parameter, etc. As another example, an application may perform a change that conflicts with a running configuration from a previous request of the same or another application. As another example, an application may perform a change that exceeds the limitation of the target or RAN.

In some examples, some conflicts may not be observed directly, but dependence among the parameters and resources that the applications are targeting can be observed (referred to herein as an "indirect conflict"). For example, an application may perform a change that creates a system impact which is equivalent to a change performed by another application (e.g., applications performing different actions, but impacts to the system are equivalent). The above are example types of conflicts and are merely some examples of the types of conflicts. Other conflicts may be observable, such as conflicts that are not observed directly of where the dependency between applications is not obvious (referred to as an "implicit conflict").

In accordance with the techniques described in this disclosure, non-RT RIC 122 may provide conflict management for one or more non-RT RIC functions or services (e.g., A1 services, O1 services, O2 services, and other services). In this example, non-RT RIC 122 may include a conflict manager 121 configured to provide conflict management for one or more non-RT RIC functions or services. Conflict manager 121 may be implemented, for example, by one or more microservices.

As further described below, non-RT RIC 122 may include a conflict manager 121 configured to determine whether A1 services have a conflict. For example, conflict manager 121 of non-RT RIC 122 may determine, in response to receiving a request from an application 123 to create a policy to be deployed to near RT-RIC 124 via the A1 interface, whether the creation of the policy would cause a conflict. If conflict manager 121 determines there is no conflict, conflict manager 121 may instruct non-RT RIC 122 (e.g., a policy manager of non-RT RIC 122) to proceed with the creation of the policy of the application 123. If conflict manager 121 determines that there is a conflict (e.g., policy statements would conflict with a previously deployed policy from the application or another application), conflict manager 121 may instruct non-RT RIC 122 to perform an action to address the conflict. Such actions to address the conflict may include, for example, implementing (or not implementing) the policy based on one or more conflict management rules. The conflict management rules may include, for example, implementing a policy based on a first come, first served basis, implementing a policy from the application with a higher priority (referred to herein as "priority-based overriding"), implementing a policy based on scope of the policy (e.g., implementing a policy with a specific scope rather than a policy with a generic scope), implementing a policy based on an Information Object Class (IOC) type or based on an IOC type and attribute of the IOC. In some examples, a user may specify which conflict management rule to apply to address the conflict.

In some examples, an application may request for guidance from the conflict manager 121 before creating a policy. In these examples, conflict manager 121 of non-RT RIC 122 may determine if there is a conflict with the creation of the policy and provide a response (e.g., guidance response) that indicates whether there is a conflict or not, includes one or more recommendations to resolve the conflict, and/or identifies the cause of the conflict (e.g., identification of contradicting statements, etc.).

Conflict manager 121 of non-RT RIC 122 may additionally, or alternatively, be configured to determine whether O1 services have a conflict. For example, conflict manager 121 may determine, in response to a request to provision configuration changes or creation of a performance management (PM) job, whether the configuration and/or performance of the O1 service would cause a conflict (e.g., with the configuration and/or performance of a previous O1 service). If conflict manager 121 determines there is no conflict, conflict manager 121 may instruct non-RT RIC 122 (e.g., a configuration manager or performance manager of non-RT RIC 122) to proceed with implementing the O1 service. If conflict manager 121 determines that there is a conflict, conflict manager 121 may instruct non-RT RIC 122 to perform an action to address the conflict, such as to implement (or not implement) the O1 service based on the conflict management rules described above (e.g., first come, first served; priority-based overriding; scope; etc.).

Conflict manager 121 of non-RT RIC 122 may further be configured to determine whether O2 services have a conflict. For example, conflict manager 121 may request to provision configuration changes on one or more resources of the O-RAN cloud. If conflict manager 121 determines there is no conflict, conflict manager 121 may instruct non-RT RIC 122 (e.g., a configuration manager or performance manager of non-RT RIC 122) to proceed with implementing the O2 service. If conflict manager 121 determines that there is a conflict, conflict manager 121 may instruct non-RT RIC 122 to perform an action to address the conflict, such as to implement (or not implement) the O2 service based on the conflict management rules described above (e.g., first come, first served; priority-based overriding; scope; etc.).

Although the examples described above are described with respect to A1, O1, and O2 services, conflict manager 121 may provide conflict management to other services, such as services management and exposure (SME) services that enable services provided over an internal interface (R1 interface) of non-RT RIC 122 and their exposure and extensibility (e.g., registration of a service, update to service registration, discoverability of a service), data management and exposure (DME) services that manage the data of applications 123, and/or other services, such as AI/ML services. For example, conflict manager 121 may determine if there is a conflict of SME services when applications 123 perform service registration and/or updates to the service registration (e.g., determine if the service conflicts with previously registered services). If conflict manager 121 determines there is no conflict, conflict manager 121 may instruct non-RT RIC 122 (e.g., a service manager of non-RT RIC 122) to proceed with the registration or update of the SME service. If conflict manager 121 determines that there is a conflict, conflict manager 121 may instruct non-RT RIC 122 to perform an action to address the conflict, such as to permit or deny the registration or update of the service. As another example, conflict manager 121 may determine if there is a conflict when applications 123 perform service discovery or authorization (e.g., determine if the service conflicts with previously discovered or authorized applications). If conflict manager 121 determines there is no conflict, conflict manager 121 may instruct non-RT RIC 122 (e.g., a service manager of non-RT RIC 122) to proceed with allowing the service to be discovered. If conflict manager 121 determines that there is a conflict, conflict manager 121 may instruct non-RT RIC 122 to perform an action to address the conflict, such as to deny the discoverability of the service.

Figure 1B:
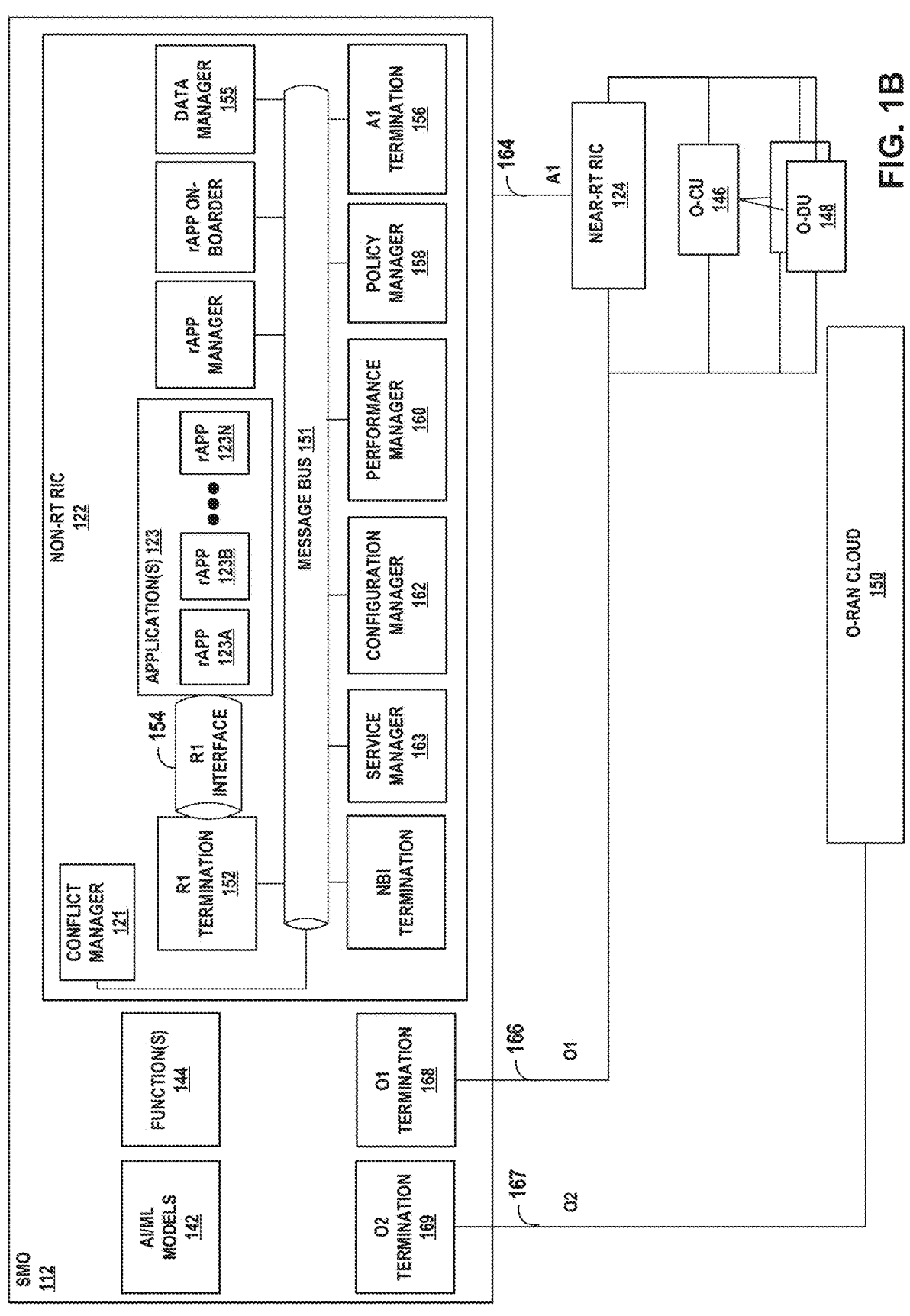
FIG. 1B is a block diagram illustrating further example details of the Non-RT RIC of the Service Management and Orchestration of FIG. 1A.

FIG. 1B is a block diagram illustrating further example details of the non-RT RIC 122 of FIG. 1A. In the example illustrated in FIG. 1B, SMO 112 may include non-RT RIC 122, one or more AI/ML models 142, one or more functions 144 (e.g., NSSMF, NFMF, and other functions), and open interfaces, such as O1 termination interface 168 and O2 termination interface 169. SMO 112 may manage non-RT RIC 122, near-RT RIC 124, O-RAN managed elements (e.g., centralized unit (O-CU) 146, O-RAN decentralized unit (O-DU) 148 of one or more base stations), and resources in O-RAN cloud 150.

Non-RT RIC 122 may be deployed as a highly scalable, microservices based containerized architecture. In this example, non-RT RIC 122 may onboard, deploy, and/or terminate one or more applications, e.g., rApp 123A through rApp 123N (collectively "applications 123"). Applications 123 may represent applications that leverage the functionality exposed via the framework of non-RT RIC 122. Applications 123 may provide non-RT RIC 122 with non-real time (e.g., greater than one second) control of RAN elements and their resources. Applications 123 may provide services for radio resource management, higher layer procedure optimization, policy optimization, and providing guidance, parameters, policies, and AI/ML models to support the operation of RAN functions.

For example, applications 123 may provide A1 services that provide and facilitate RAN operations and optimization of near-RT RIC 124, such as providing operational guidance (e.g., policies), enrichment information (e.g., forecasts), and AL/ML services. A1 services may include policy management services such as creating, updating, and/or deleting of A1 policies; receiving policy feedback; querying policy types, identifiers, and status; defining which policy types are supported by near-RT RIC 124; and registering applications (xApps) of near-RT RIC 124 to specific policy types. A1 services may include enrichment information services, such as providing data for model training of AI/ML models, such as forecasts and/or data analytics.

Applications 123 may provide O1 services that provide configuration management or performance management of O-RAN managed entities, such as near-RT RIC 124 and/or RAN nodes, e.g., O-CU 146, O-DU 148 (also referred to herein as "E2 nodes"). O1 services may provide configuration management services to create, update, and/or delete configurations to O-RAN managed entities. For example, configuration management services may include provisioning operations (e.g., for NSS and NF provisioning) to create a managed object instance (MOI), obtain MOI attributes, modify MOI attributes, and/or delete the MOI. O1 services may also provide performance management services that monitor the status of elements or components in the O-RAN managed entities. For example, non-RT RIC 122 may create, modify, or delete performance management jobs to send heartbeat messages to monitor the status and/or availability of services of RAN nodes or to send trace messages to monitor link failures. O1 services may also provide file management, such as to push files to the RAN nodes (e.g., software updates, beamforming configuration files, ML models, security certificates, etc.).

Applications 123 may provide O2 services that provide infrastructure management and/or network function deployment of resources in O-RAN cloud 150 (also referred to herein as "O-Cloud 150"). O2 services may provide discovery and administration of O-Cloud resources; Scale-In, Scale-Out of cloud/deployments (e.g., deploying resources with more or less processors); FCAPS of cloud/deployments, software management of cloud platform/deployments; create/delete deployment and associated allocated O-Cloud resources.

Applications 123 may provide service management and exposure (SME) services, data management and exposure (DME) services, and/or other services. SME services may provide services that enable services provided over an internal interface (R1 interface 154) of non-RT RIC 122 and their exposure and extensibility through services including bootstrap, service registration/deregistration or updates to service registration, service discovery or notification, heartbeat, authentication, authorization, etc. Data management and exposure (DME) services may include services that manage data and their exposure between applications 123.

For example, applications 123 may have different functions, such as application 123A configured to collect and analyze data, application 123B configured to generate an ML model based on the results of the analysis, and application 123N configured to make a prediction or inference using the ML model and/or to generate controls for RAN nodes based on the prediction or inference. DME services may manage the data shared between applications 123, such as the collection of data, the processing of the data, and/or the advertisement of the data.

Non-RT RIC 122 may include one or more managers to process the A1, O1, O2, SME, DME services, and other services. For example, non-RT RIC 122 may include a policy manager 158, performance manager 160, configuration manager 162, service manager 163, data manager 155, and conflict manager 121. Non-RT RIC 122 may include other managers, such as an application manager and an application on-boarder, that are configured to manage the installation and deployment of applications 123.

Policy manager 158 is configured to control the deployment of policies (e.g., A1 services). For example, in response to receiving requests for A1 services from applications 123 via R1 interface 154, R1 interface 154 sends the requests to policy manager 158 via message bus 151. Policy manager 158 may process the A1 services and may send the A1 services to A1 termination 156 via message bus 151, which provides the A1 services to near-RT RIC 124 via A1 interface 164. In some examples, the A1 interface may implement an A1AP application protocol based on the 3GPP framework.

Performance manager 160 is configured to control the deployment of O1 services for monitoring the performance of near-RT RIC 124 and/or RAN nodes (e.g., O-CU 146, O-DU 148). For example, in response to receiving requests for O1 services for monitoring the performance of near-RT RIC 124 from applications 123 via R1 interface 154, R1 interface 154 sends the requests to performance manager 160 via message bus 151. Performance manager 160 may process the O1 services and may send the O1 services to O1 termination 168, which provides the O1 services to near-RT RIC 124 via O1 interface 166. In some examples, the O1 interface may implement REST/HTTPS APIs and/or NET-CONF. Performance manager 160 may also be configured to control the deployment of O2 services for monitoring the performance of resources of O-Cloud 150. For example, in response to receiving requests for O2 services for monitoring the performance of resources within O-Cloud 150 via R1 interface 154, R1 interface 154 sends the requests to performance manager 160. Performance manager 160 may process the O2 services and may send the O2 services to O2 termination 169, which provides the O2 services to resources of O-Cloud 150 via O2 interface 167.

Configuration manager 162 is configured to control the deployment of O1 services for the configuration of near-RT RIC 124 and/or RAN nodes. For example, in response to receiving requests for O1 services for the configuration of near-RT RIC 124 from applications 123 via R1 interface 154, R1 interface 154 sends the requests to configuration manager 162. Configuration manager 162 may process the O1 services and may send the O1 services to O1 termination 168, which provides the O1 services to near-RT RIC 124 via O1 interface 166. Configuration manager 162 may also be configured to control the deployment of O2 services for the configuration of resources of O-Cloud 150. For example, in response to receiving requests for O2 services for configuring resources within O-Cloud 150 from applications 123 via R1 interface 154, R1 interface 154 sends the requests to configuration manager 162. Configuration manager 162 may process the O2 services and may send the O2 services to O2 termination 169, which provides the O2 services to resources of O-Cloud 150 via O2 interface 167.

In some examples, R1 interface 154 also exposes applications 123 to SME services, DME services, and/or other services. For example, in response to receiving requests for SME services from applications 123 via R1 interface 154, R1 interface 154 sends the requests to service manager 163. Service manager 163 may process the SME services (e.g., register/update a service) and may send the SME services to R1 termination 152, which provides the SME services to applications 123 via R1 interface 154 (e.g., sending response to application regarding service registration, update, or discovery). Similarly, in response to receiving requests for DME services from applications 123 via R1 interface 154, R1 interface 154 sends the requests to data manager 155. Data manager 155 may process the DME services and may send the DME services to R1 termination 152, which provides the DME services to applications 123 via R1 interface 154 (e.g., sending data from application configured as a data producer to application configured as a data consumer).

R1 interface 154 may also expose applications 123 to slice subnet management services, such as RAN NSSMF interfaces to retrieve slice service level agreements (SLAs) and slice topologies, and/or slice management, SLA, and slice performance management notifications to applications 123.

In accordance with the techniques described in this disclosure, conflict manager 121 is configured to provide conflict management for services of the corresponding interface(s) of non-RT RIC 122. In some examples, conflict manager 121 may be implemented, for example, by one or more microservices of non-RT RIC 122. While conflict manager 121 is illustrated as a separate microservice of non-RT RIC 122, in some examples, the techniques described herein may be performed by one or more other microservices, such as policy manager 158, performance manager 160, configuration manager 152, service manager 163, and/or data manager 155. In this example, in response to receiving a request of an A1 service, O1 service, O2 service, or other services (e.g., SME, DME), R1 termination 152 may send a message via message bus 151 to conflict manager 121 to perform conflict management of the A1 service, O1 service, O2 service, or other services.

As one example, conflict manager 121 may provide conflict management for A1 services to create, modify, or delete a policy. A policy may be a declarative policy expressed using formal statements that enable non-RT RIC 122 to guide the near-RT RIC 124 function. As one example, a policy may comprise a scope identifier and one or more policy statements. A scope identifier may represent what the policy statements are to be applied on (e.g., cells, network slices, UEs, UE groups, Quality of Service (QOS) flows, etc.). The one or more policy statements may specify policy goals, such as policy objectives (e.g., QOS, Quality of Experience (QoE), UE level, slice SLA objectives) and policy resources (e.g., resource usage for the policy). Additional examples of policy management services are described in O-RAN.WG2.A1GAP-R003-v03.01; "O-RAN Working Group 2 (Non-RT RIC and A1 interface WG); A1 interface: General Aspects and Principles," October, 2023, the entire contents of which is incorporated by reference herein. An example of a policy created by a first application (e.g., rApp 123A) is shown below:

Example A1 policy:

```
{
   "scope": {
      "sliceId": {
         "sst": 3, "sd": "456DEF",
         "plmnId":   { "mcc":"248", "mnc":"35" }
      }
   },
   "sliceSlaObjectives": {
      "maxNumberOfUes": 10000,
      "maxNumberOfPduSessions": 800 },
   "sliceSlaResources": {
      "cellIdList": [
         {"plmnId": {"mcc": "248","mnc": "35"}, "cId": {"ncI": 1}},
         {"plmnId": {"mcc": "248","mnc": "35"}, "cId": {"ncI": 2}}
      ]
   }
}
```

The scope of the above policy includes a slice with slice SLA objectives specifying the maximum number of UEs (e.g., 10000) and maximum number of PDU sessions (e.g., 800), and slice SLA resources specifying target cells in near-RT RIC domain includes certain types of cells.

In some instances, a second application (e.g., rApp 123B) may request to create a policy that conflicts with the policy of the first application. For example, an example of a policy of the second application (e.g., rApp 123B) is shown below:

Example A1 policy:

```
}
   "scope": {
      "sliceId": {
         "sst": 3, "sd": "456DEF",
         "plmnId":   { "mcc":"248", "mnc":"35" }
      }
   },
   "sliceSlaObjectives": {
      "maxNumberOfUes": 30000,
      "maxNumberOfPduSessions": 800 },
   "sliceSlaResources": {
      "cellIdList": [
         {"plmnId": {"mcc": "248","mnc": "35"}, "cId": {"ncI": 1}},
         {"plmnId": {"mcc": "248","mnc": "35"}, "cId": {"ncI": 2}}
      ]
   }
}
```

Conflict manager 121 may determine whether there are conflicts between the policies of applications 123 (rApps), for example, by determining whether there are contradicting and/or overlapping combinations of scope and/or policy statements (e.g., objective/resource statements). In this example, conflict manager 121 may determine that there is a conflict between the objective statements (e.g., policy of the first application (rApp 123A) that specifies a maximum number of UEs as 10000 and the policy of the second application (e.g., rApp 123B) that specifies a maximum number of UEs as 30000).

Based on the determination that there is a conflict between the objective statements of the policy of application 123A and the objective statements of the policy of application 123B, conflict manager 121 may instruct non-RT RIC 122 to perform an action to address the conflict. In some examples, conflict manager 121 may determine which of the conflicting policies to implement based on one or more conflict management rules. As one example, conflict manager 121 may implement a first come, first served rule. In this example, non-RT RIC 122 may implement the policy of the first application if the request to create the policy of the first application precedes the request to create the policy of the second application. Alternatively, or additionally, conflict manager 121 may implement a priority-based overriding rule where the policy of an application with a higher priority is implemented. For example, conflict manager 121 may implement the policy of the second application based on the second application having a higher priority than the first application. In some examples, conflict manager 121 may override a policy with a general scope with a policy specifying a narrower scope. For example, non-RT RIC 122 may implement a policy for a UE specific performance target over a policy specifying performance target for all UEs. In some examples, an operator may configure the conflict management rule to apply for each policy statement. For example, the operator may configure the implementation of a first conflict management rule in response to the determination of a conflict with a first policy statement and configure the implementation of a second conflict management rule that is different than the first conflict management rule in response to the determination of a conflict with a second policy statement. In some examples, parameters of a network resource may be classified into different types, such as an Information Object Class (IOC), ProxyClass, and Data-Type parameters. An IOC describes the information that can be used in management interfaces. The IOC includes attributes that represent the various properties of the IOC. In these examples, non-RT RIC 122 may apply a conflict management rule based on parameter or based on parameter and parameter type. In some examples, non-RT RIC 122 may provide operator-configurable conflict management rules (e.g., user can specify the type of conflict management rule to apply).

In some examples, an application (e.g., rApp A) may request for policy guidance before requesting to create the policy. In these examples, conflict manager 121 may, in response to receiving a request for conflict guidance for a policy, check the target near-RT RIC 124 and/or check for overlapping scope, contradicting statements, validating limits (e.g., whether limits are exceeded or not), and/or conflicting indirect actions. Conflict manager 121 may provide a response (guidance response) including an indication of whether the policy creates a conflict or not. In some examples, conflict manager 121 may provide a response including one or more recommendations to resolve the conflict (e.g., recommendation to resolve overlapping scope). Alternatively, or additionally, conflict manager 121 may provide a response including information on the cause of the conflict, such as a list of contradicting statements (e.g., contradicting objective/resource parameters).

As another example, conflict manager 121 may provide conflict management for O1 services to create configuration requests for managed object instances (MOI) of O-RAN managed elements (e.g., near-RT RIC 124, O-CU 146, O-DU 148). In this example, a first application (e.g., rApp 123A) may have previously issued a configuration request to create an MOI of O-DU 148. Conflict manager 121 may determine whether a configuration request of a second application (e.g., rApps 123B) to create an MOI of O-DU 148 conflicts with the previous configuration request of the first application to create the MOI of O-DU 148. Based on the determination of whether there is a conflict between the configuration request of the first application and the configuration request of the second application, conflict manager 121 may instruct non-RT RIC 122 to perform an action to address the conflict. Conflict manager 121 may determine which of the conflicting configuration requests to implement based on one or more conflict management rules (e.g., first come, first served; priority-based overriding; scope; etc.), as described above.

As another example, conflict manager 121 may provide conflict management for O2 services to provision configuration changes to resources of O-Cloud 150. For example, a first application (e.g., rApp 123A) may have previously issued a configuration request to scale up the number of processors of a resource of O-Cloud 150. Conflict manager 121 may determine whether a configuration request by a second application (e.g., rApp 123B) to provision a configuration change to the resource conflicts with the previous configuration of the resource as requested by the first application. As one example, if the second application request to configure the resource of O-Cloud 150 to reduce the number of processors to save energy, conflict manager 121 may determine that there is a conflict if the configuration request of the first application configures the resource to increase the number of processors for scalability. Based on the determination that there is a conflict between the configuration requests of the resource of O-Cloud 150, conflict manager 121 may instruct non-RT RIC 122 to perform an action to address the conflict. Conflict manager 121 may determine which of the conflicting configuration requests to implement based on one or more conflict management rules (e.g., first come, first served; priority-based overriding; scope; etc.), as described above.

Figure 2A:
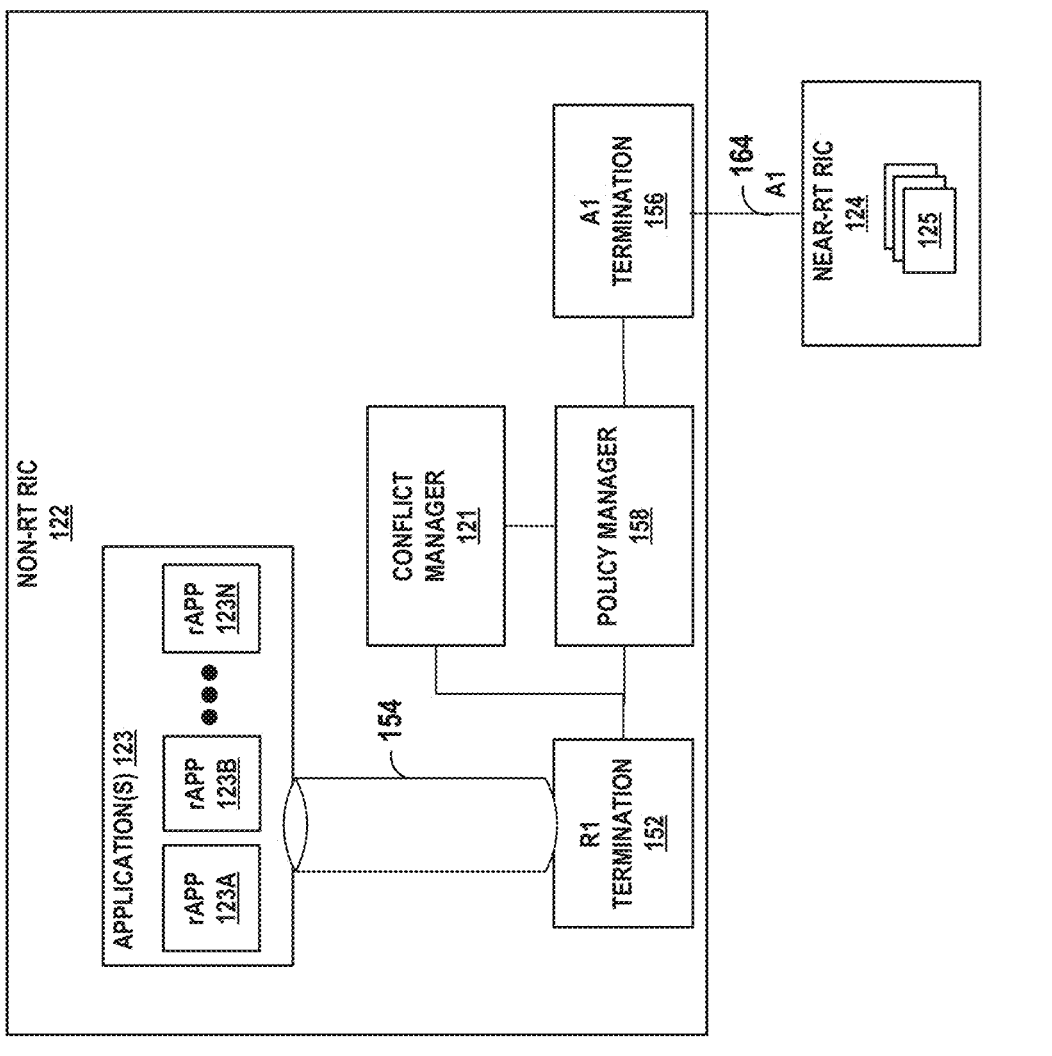
FIG. 2A is a block diagram illustrating an example non-RT RIC providing conflict management of A1 services, in accordance with one or more techniques of this disclosure.

FIG. 2A is a block diagram illustrating an example non-RT RIC 122 providing conflict management of A1 services, in accordance with one or more techniques of this disclosure. In this example, conflict manager 121 may provide conflict management of A1 services (e.g., policy management requests) provided by applications 123 (rApps). Although the techniques for providing conflict management of A1 services are described with respect to conflict manager 121 of FIG. 2A, the techniques for providing conflict management of A1 services may alternatively, or additionally, be performed by policy manager 158 of FIG. 1B or any other microservice of non-RT RIC 122.

Non-RT RIC 122 may include an A1 interface 164 that provides an interface between non-RT RIC 122 and near-RT RIC 124. A1 interface 164 may support A1 services, such as policy management services, enrichment information services, and/or AI/ML services. In this example, R1 termination 152 may receive, via R1 interface 154, a request of an A1 service from rApp 123A, such as a request to create a policy for near-RT RIC 124. The request may include a policy type identifier, a policy, and a scope identifier (e.g., identifier of near-RT RIC 124). In response, R1 termination 152 sends a message to conflict manager 121 (e.g., via a message bus) to determine whether the A1 service has a conflict. For example, conflict manager 121 may examine the formal statements within the policy for contradicting and/or overlapping combinations of scope and policy statements. Conflict manager 121 may determine whether there is a direct conflict between policies of one or more applications 123. For example, conflict manager 121 may determine whether each request specifies different settings for the very same parameters of a target (e.g., two policies include contradicting statements, such as setting different priorities for a slice within a cell, different QoS priority for a QoS of a UE, contradicting technical specification (TS) guidance for a UE or slice, etc.), specifies overlapping scopes, or whether the policies of applications 123 perform a change that exceeds the limitation of the target or RAN (e.g., an application 123 setting unrealistic downlink throughput target for a UE). In some examples, conflict manager 121 may determine whether there is an indirect conflict, such as whether one application sets a performance target for all UEs of a slice and another application sets UE specific performance target, or whether an application load balances per-cell per-slice to carry load to another cell while another application does technical specification for that slice that forbids the target cell as a primary/secondary cell.

If conflict manager 121 determines there is no conflict, conflict manager 121 may instruct policy manager 158 of non-RT RIC 122 to proceed with the creation of the policy for the application 123. For example, conflict manager 121 may instruct policy manager 158 to process the request to create the policy. Policy manager 158 may generate a command (e.g., HTTP PUT statement) to create the policy and sends the command to A1 termination 156, which in turn sends the command to near RT RIC 124 via A1 interface 164. In response to the creation of the policy on near-RT RIC 124, near-RT RIC 124 may create and send a response to A1 termination 156 that indicates the policy has been created, which in turn communicates the response to R1 termination 152 to send the response to rApp 123A.

If conflict manager 121 determines that there is a conflict, conflict manager 121 may instruct non-RT RIC 122 to perform an action to address the conflict, such as to implement (or not implement) the A1 service based on the rules described above (e.g., first come, first served; priority-based overriding; scope; etc.).

In some examples, an application (e.g., rApp 123A) may request for guidance before the creation of a policy. For example, R1 termination 152 may receive, via R1 interface 154, a request for guidance on the creation of a policy (e.g., HTTP PUT method) for near-RT RIC 124. R1 interface 154 sends the guidance request to conflict manager 121, which determines whether a conflict would occur if the policy were created. Based on the determination of whether there is a conflict, conflict manager 121 may generate a response to the guidance request that specifies whether the creation of the policy would create a conflict or not. In some examples, conflict manager 121 may provide one or more recommendations to resolve the conflict (e.g., recommendation to resolve overlapping scope). Alternatively, or additionally, conflict manager 121 may provide information on the cause of the conflict, such as a list of contradicting statements (e.g., contradicting objective/resource parameters). Conflict manager 121 may send the response to the guidance request to R1 termination 152, which in turn sends the response to rApp 123A.

Figure 2B:
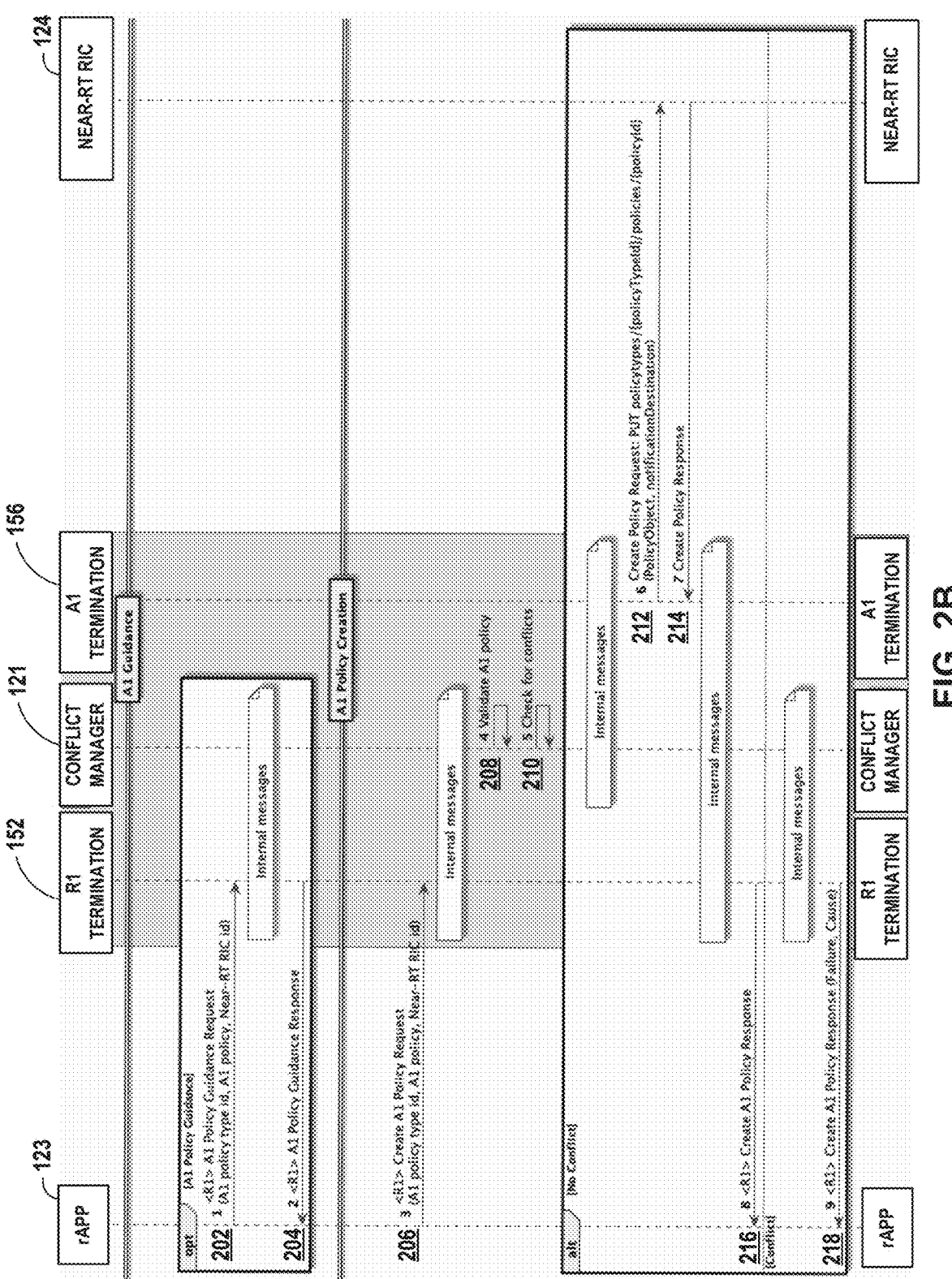
FIG. 2B is a flow diagram of an example conflict management of an A1 service, in accordance with one or more techniques of the disclosure.

FIG. 2B is a flow diagram of an example conflict management of an A1 service, in accordance with one or more techniques of the disclosure. FIG. 2B is described with respect to conflict manager 121 of FIG. 2A but may also apply to policy manager 158 of FIG. 1B or any other microservices of non-RT RIC 122. Although the example described in FIG. 2B is described with respect to a request to create a policy, the techniques may similarly apply to the modification or deletion of a policy.

In the example of FIG. 2B, steps (202) and (204) may represent the steps for providing policy guidance. For example, an application 123 may send a policy guidance request ("A1 Policy Guidance Request") to R1 termination 152 (202), which sends a message to conflict manager 121 to provide guidance on whether the creation of the policy would have a conflict. The policy guidance request may include an identifier (A1 policy type ID), a policy (A1 policy), and an identifier of a target for the policy (Near-RT RIC id). In response to determining whether there is a conflict, conflict manager 121 sends a response (A1 Policy Guidance Response) to the application that sent the guidance request (204). As described above, the response to the guidance request may include an indication of whether the policy creates a conflict or not, one or more recommendations to resolve the conflict, information on the cause of the conflict, such as a list of contradicting statements, or any other information.

Steps (206) through (218) may represent the steps for providing conflict management, as described in this disclosure. For example, an application 123 may send a request to create a policy (Create A1 Policy Request) to R1 termination 152 (206). The request may include an identifier (A1 policy type ID), a policy (A1 policy), and an identifier of near-RT RIC 124 (Near-RT RIC id). R1 termination 152 sends a message to conflict manager 121 to determine whether there is a conflict or not with the specified policy. Conflict manager 121 may validate the policy (208) and determine whether there are any conflicts (210). For example, conflict manager 121 may examine the formal statements within the policy for contradicting and/or overlapping combinations of scope and policy statements with other A1 policies.

In response to determining that there is no conflict, conflict manager 121 may instruct policy manager 158 to create the policy request for near-RT RIC 124 (212). For example, policy manager 158 may execute an HTTP PUT request to create the policy on near-RT RIC 124. In response to the creation of the policy on near-RT RIC 124, near-RT RIC 124 may create and send a response to A1 termination 156 that indicates the policy has been created (214), which in turn communicates the response to R1 termination to send the response to the application (216).

In response to determining that there is a conflict, conflict manager 121 may create a response (Create A1 Policy Response) that indicates there is a conflict (218). In some examples, conflict manager 121 may implement one or more conflict management rules in response to determining that there is a conflict, such as first come, first served; priority-based overriding; scope of the policy; etc.

Figure 3A:
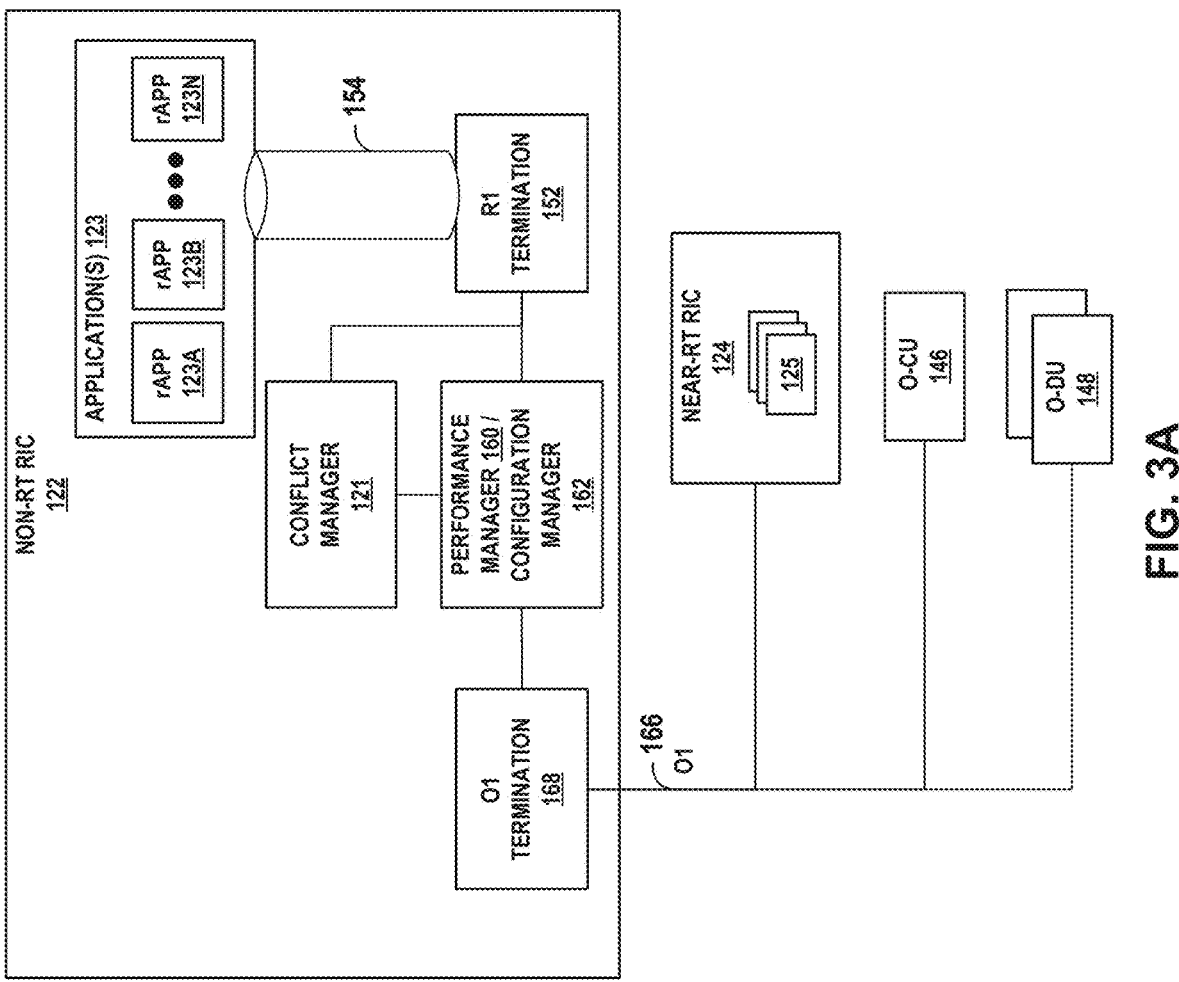
FIG. 3A is a block diagram illustrating an example non-RT RIC providing conflict management of O1 services, in accordance with one or more techniques of this disclosure.

FIG. 3A is a block diagram illustrating an example non-RT RIC 122 providing conflict management of O1 services, in accordance with one or more techniques of this disclosure. In this example, conflict manager 121 may provide conflict management of O1 services (e.g., configuration management or performance management requests) provided by applications 123 (rApps). Although the techniques for providing conflict management of O1 services are described with respect to conflict manager 121 of FIG. 1B, the techniques for providing conflict management of O1 services may alternatively, or additionally, be performed by performance manager 160 and/or configuration manager 162 of FIG. 1B or any other microservice of non-RT RIC 122.

Non-RT RIC 122 may include an O1 interface 166 that provides an interface between SMO 112 and the infrastructure management framework supporting O-RAN virtual network functions (e.g., xApps of near-RT RIC 124 and E2 nodes). O1 interface 166 may support O1 services, such as configuration management services and/or performance management services. In this example, R1 termination 152 may receive, via R1 interface 154, a request of an O1 service from rApp 123A, such as a configuration request to create an MOI for an O-RAN managed element (e.g., O-DU 148 of a base station). In response, R1 termination 152 sends a message to conflict manager 121 to determine whether there are conflicts with the configuration modifications requested by the one or more applications 123. For example, an application may request to modify configuration of a base station, such as a cell identifier. In this example, conflict manager 121 may determine whether the configuration request to modify the cell identifier for the base station would cause a conflict.

If conflict manager 121 determines there is no conflict, conflict manager 121 may instruct configuration manager 162 to proceed with implementing the O1 service. For example, conflict manager 121 may instruct configuration manager 162 to process the request to create the configuration. Configuration manager 162 may generate a command (e.g., createMOI request) to create the configuration and sends the command to O1 termination 168, which in turn sends the command to O-DU 148 via O1 interface 166.

If conflict manager 121 determines that there is a conflict, conflict manager 121 may instruct non-RT RIC 122 to perform an action to address the conflict, such as to implement (or not implement) the O1 service based on the conflict management rules described above (e.g., first come, first served; priority-based overriding; scope; etc.).

As another example, R1 termination 152 may receive a request to create a performance job (e.g., performance assurance) for O-DU 148. In response, R1 interface 154 sends a message to conflict manager 121 to determine whether there are conflicts with the creation of the performance job requested by the one or more applications 123. For example, an application may request the creation of a performance job that has overlapping IOCs and attributes, contradicts attribute value changes, specify different data networks, etc. In this example, conflict manager 121 may determine whether the request to create the performance job would cause a conflict.

If conflict manager 121 determines there is no conflict, conflict manager 121 may instruct performance manager 160 to proceed with implementing the O1 service. For example, conflict manager 121 may instruct performance manager 160 to process the request to create the performance job. Performance manager 160 may generate a command to create the performance job and sends the command to O1 termination 168, which in turn sends the command to O-DU 148 via O1 interface 166.

If conflict manager 121 determines that there is a conflict, conflict manager 121 may instruct non-RT RIC 122 to perform an action to address the conflict, such as to implement (or not implement) the O1 service based on the conflict management rules described above (e.g., first come, first served; priority-based overriding; scope; etc.).

Figure 3B:
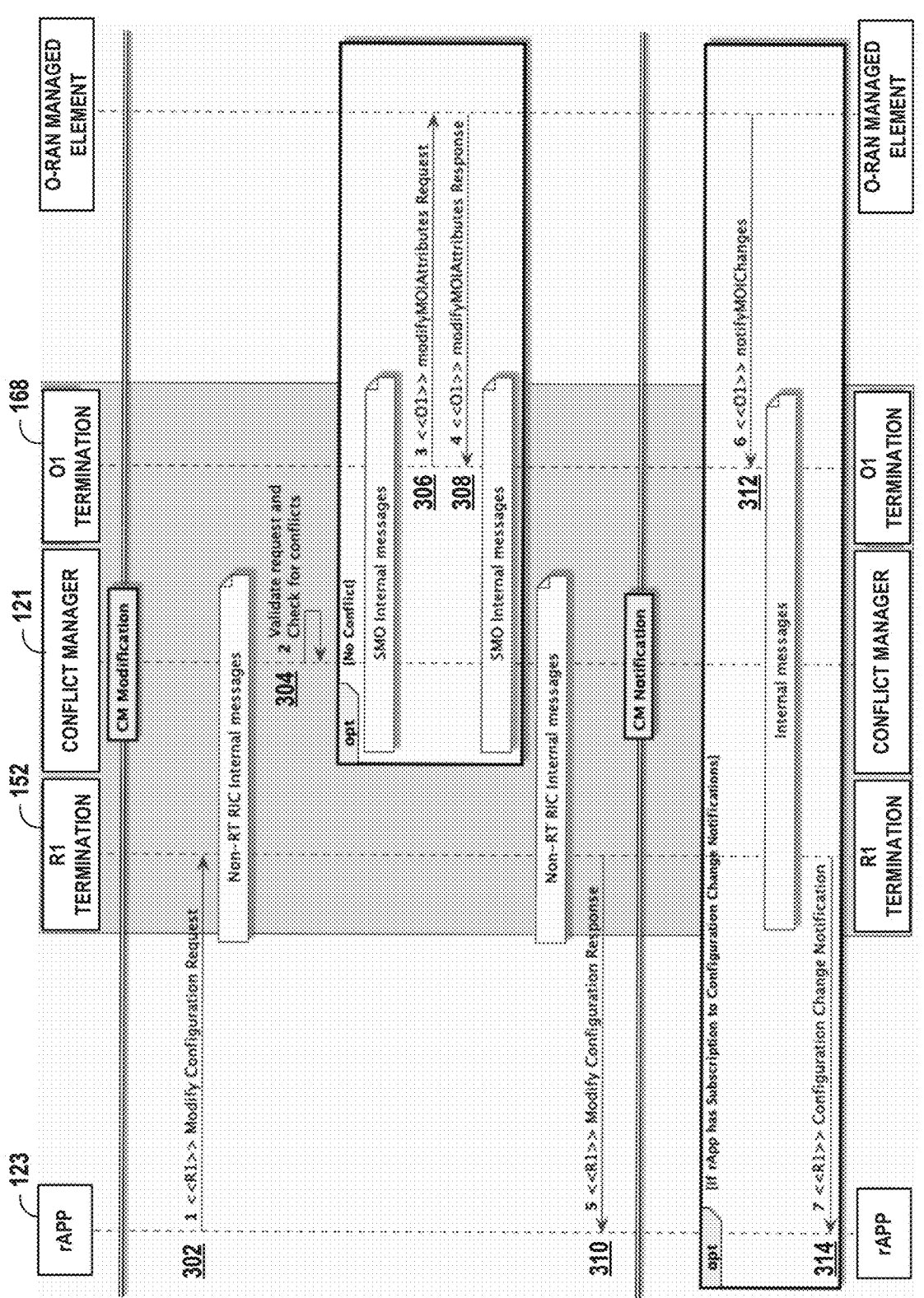
FIG. 3B is a flow diagram of an example conflict management of an O1 service, in accordance with one or more techniques of the disclosure.

FIG. 3B is a flow diagram of an example conflict management of an O1 service, in accordance with one or more techniques of the disclosure. FIG. 3B is described with respect to conflict manager 121 of FIG. 3A but may also apply to performance manager 160 or configuration manager 162 of FIG. 1B. Although the example described in FIG. 3B is described with respect to a request to modify a configuration request, the techniques may also apply to the creation or deletion of a configuration request and/or the creation, modification, or deletion of a performance job.

In the example of FIG. 3B, application 123 may send a request for an O1 service (e.g., to create, modify, or delete a configuration or a performance job) to R1 termination 152 (302), which sends a message to conflict manager 121 to determine whether there is a conflict or not with the specified O1 service. Conflict manager 121 may validate the O1 service and determine whether the O1 service has any conflicts (304).

In response to determining that there is no conflict, conflict manager 121 may instruct configuration manager 162 or performance manager 160 (depending on the type of O1 service) to proceed with implementing the O1 service. For example, configuration manager 162 may process the O1 service for an O-RAN managed element (e.g., near-RT RIC 124, O-CU 146, O-DU 148) by generating a command (e.g., modifyMOIAttributes request) to modify the attributes of the O-RAN managed element and sends the command to O1 termination 168, which in turn sends the command to the O-RAN managed element (e.g., O-DU 148) via O1 interface 166 (306). Similarly, performance manager 160 may process the O1 service for an O-RAN managed element by generating a command to create the performance job and sends the command to O1 termination 168, which in turn sends the command to the O-RAN managed element via O1 interface 166. In response to performing the O1 service (e.g., modifying MOI attributes, creating performance job, etc.), the O-RAN managed element may create and send a response to O1 termination 168 (308). Conflict manager 121 may generate a response to the request for the O1 service and send the response to R1 termination 152, which in turn sends the response to the application (310).

In some examples, conflict manager 121 may notify the application of changes to the configuration of O-RAN managed elements (if the application is subscribed to configuration change notifications). For example, in response to a change in configuration, the O-RAN managed element may send a notification of configuration changes to O1 termination 168 (312). Configuration manager 121 may generate a notification of the configuration changes and sends the notification to R1 termination 152, which in turn sends the notification to the application that is subscribed to receive notifications of configuration changes to O-RAN managed elements (314).

Figure 4:
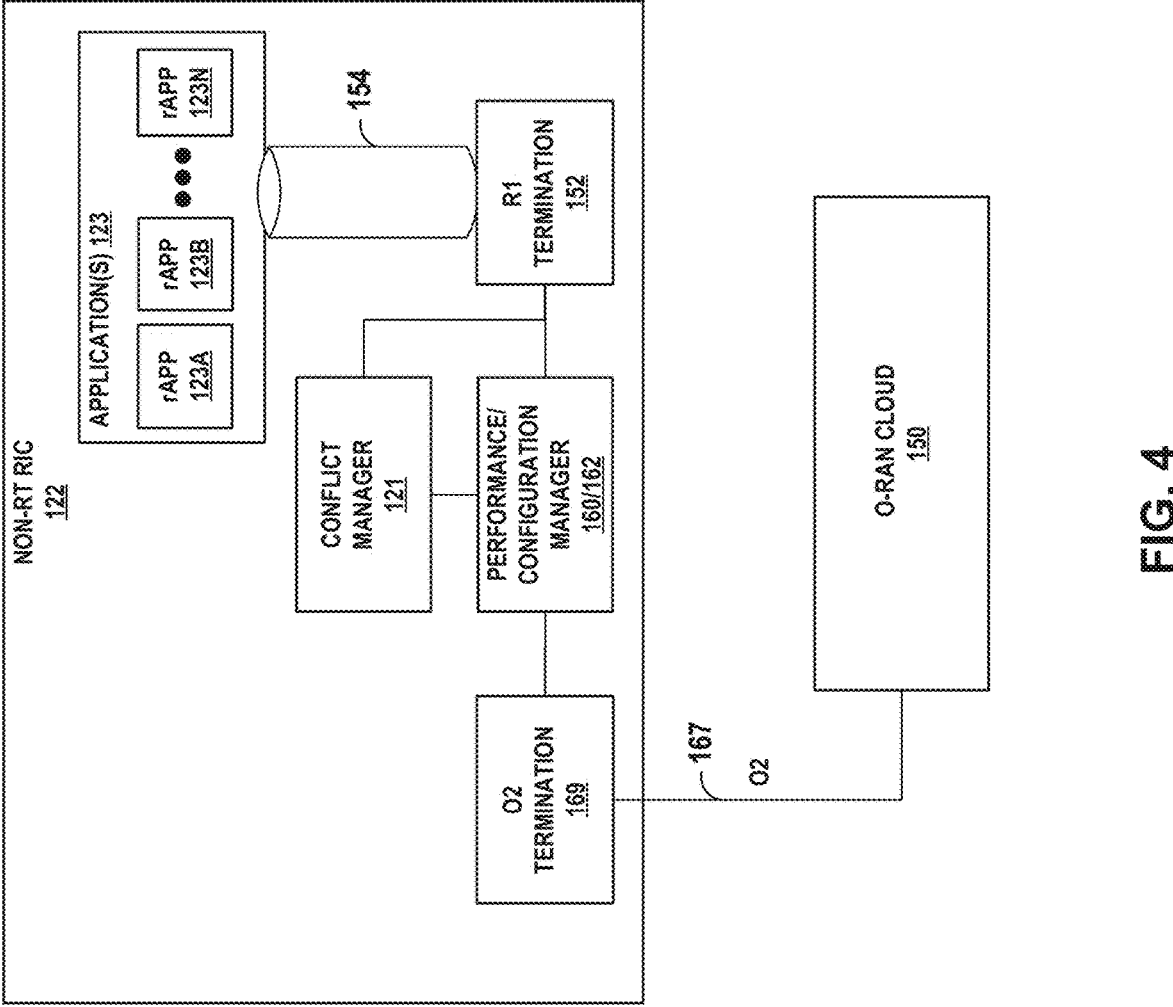
FIG. 4 is a block diagram illustrating an example non-RT RIC providing conflict management of O2 services, in accordance with one or more techniques of this disclosure.

FIG. 4 is a block diagram illustrating an example non-RT RIC 122 providing conflict management of O2 services, in accordance with one or more techniques of this disclosure. In this example, conflict manager 121 may provide conflict management of O2 services (e.g., configuration management or performance management requests) provided by applications 123 (rApps). Although the techniques for providing conflict management of O2 services are described with respect to conflict manager 121 of FIG. 1B, the techniques for providing conflict management of O2 services may alternatively, or additionally, be performed by performance manager 160 and/or configuration manager 162 of FIG. 1B or any other microservice of non-RT RIC 122. The conflict management of O2 services performed by conflict manager 121 may operate substantially similar to the operations of the conflict management of O1 services, as described and illustrated in FIG. 3B.

Non-RT RIC 122 may include an O2 interface 167 that provides an interface between SMO 112 and one or more resources of O-RAN cloud 150. O2 interface 167 may support O2 services, such as configuration management services and/or performance management services for resources of O-Cloud 150, such as one or more physical infrastructure nodes that host O-RAN functions (e.g., virtual network functions), the supporting software components, and the appropriate management and orchestration functions. In this example, R1 termination 152 may receive, via R1 interface 154, a request of an O2 service, such as a request to modify the configuration of a node of O-Cloud 150. The request may specify a modification of the configuration of the node to use additional processors for scalability. In response, R1 interface 154 sends a message to conflict manager 121 to determine whether there are conflicts with the configuration modifications requested by the one or more applications 123. Conflict manager 121 may provide conflict management of O2 services similar to the conflict management of O1 services as described above. In this example, conflict manager 121 may determine whether the configuration request to modify the configuration of the node to use additional processors would cause a conflict (e.g., conflicting a previous request to configure the node to use fewer processors to save energy).

If conflict manager 121 determines there is no conflict, conflict manager 121 may instruct configuration manager 162 to proceed with implementing the O2 service. For example, conflict manager 121 may instruct configuration manager 162 to process the request to create the configuration. Configuration manager 162 may generate a command to create the configuration and sends the command to O2 termination 169, which in turn sends the command to the node of O-Cloud 150 via O2 interface 167.

If conflict manager 121 determines that there is a conflict, conflict manager 121 may instruct non-RT RIC 122 to perform an action to address the conflict, such as to implement (or not implement) the O2 service based on the conflict management rules described above (e.g., first come, first served; priority-based overriding; scope; etc.).

Figure 5A:
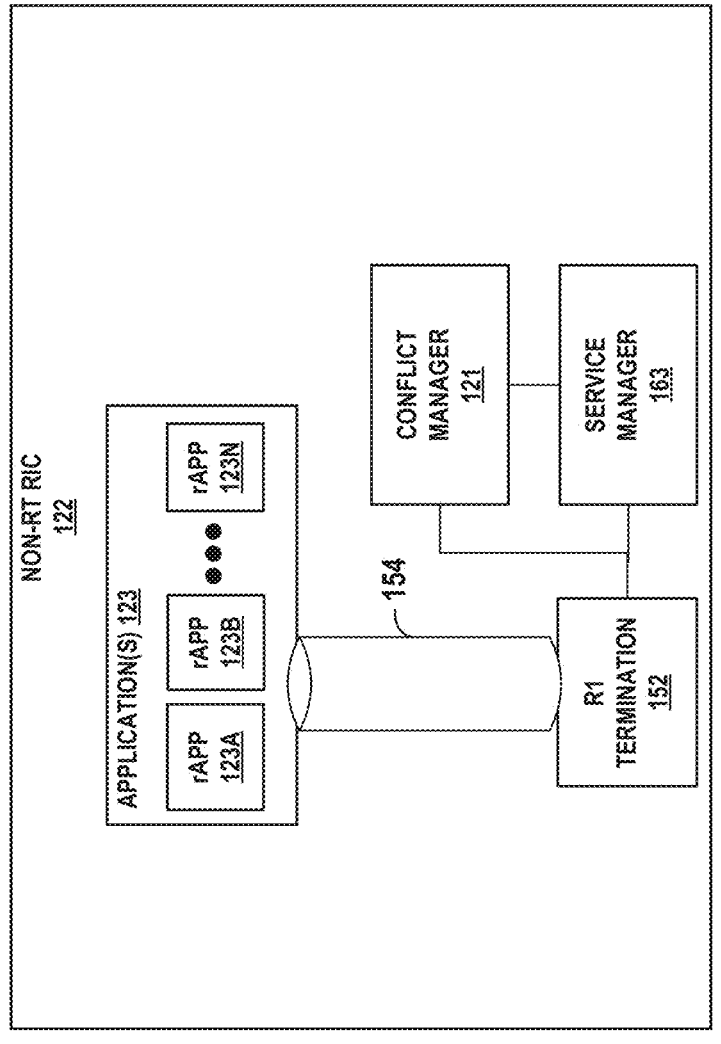
FIG. 5A is a block diagram illustrating an example non-RT RIC providing conflict management of SME services, in accordance with one or more techniques of this disclosure.

FIG. 5A is a block diagram illustrating an example non-RT RIC 122 providing conflict management of SME services, in accordance with one or more techniques of this disclosure. In this example, conflict manager 121 may provide conflict management of SME services (e.g., service requests) provided by applications 123 (rApps). Although the techniques for providing conflict management of SME services are described with respect to conflict manager 121 of FIG. 1B, the techniques for providing conflict management of SME services may alternatively, or additionally, be performed by service manager 163 or any other microservice of non-RT RIC 122.

Non-RT RIC 122 may include an R1 interface 154 that provides an interface between one or more applications 123 and R1 termination 152. R1 interface 154 exposes applications 123 to SME services. SME services may provide services that enable R1 services and their exposure and extensibility through services including bootstrap, service registration/deregistration or updates to service registration, service discovery or notification, heartbeat, authentication, authorization, etc. In this example, R1 termination 152 may receive, via R1 interface 154, a request of an SME service from rApp 123A, such as a request to register a service via R1 interface 154. The request may specify an identifier of rApp 123A, a service profile, or other information for registering a service. In response, R1 interface 154 sends a message to conflict manager 121 to determine whether there are conflicts with the request to register the service.

Conflict manager 121 may determine whether the request to register the service would cause a conflict (e.g., conflicting a previously registered request). If conflict manager 121 determines there is no conflict, conflict manager 121 may instruct service manager 163 to proceed with registering the service. Service manager 163 may register the service and sends a response to the service registration to R1 termination 152, which in turn sends the response to rApp 123A via R1 interface 154.

If conflict manager 121 determines that there is a conflict, conflict manager 121 may instruct non-RT RIC 122 to perform an action to address the conflict, such as to implement (or not implement) the SME service based on the conflict management rules described above (e.g., first come, first served; priority-based overriding; scope; etc.).

Figure 5B:
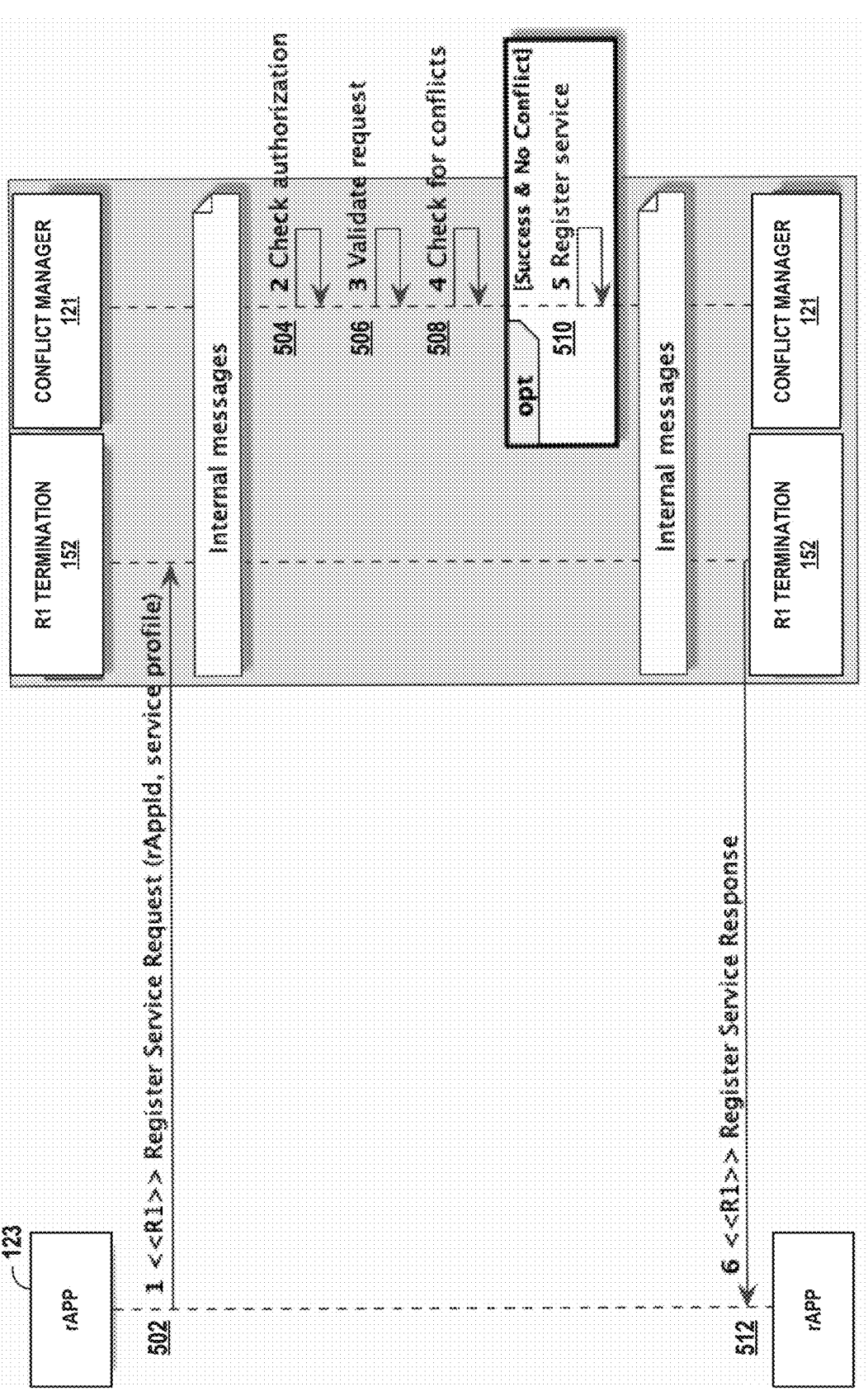
FIG. 5B is a flow diagram of an example conflict management of an SME service, in accordance with one or more techniques of the disclosure.

FIG. 5B is a flow diagram of an example conflict management of an SME service, in accordance with one or more techniques of the disclosure. FIG. 5B is described with respect to conflict manager 121 of FIG. 5A but may also apply to service manager 163 or any other microservice of non-RT RIC 122. Although the example described in FIG. 5B is described with respect to registering a service, the techniques may also apply to the modification or deletion of a service.

In the example of FIG. 5B, application 123 may send a request for an SME service (e.g., to register a service request) to R1 termination 152 (502), which sends a message to conflict manager 121 to determine whether there is a conflict or not with the specified SME service. Conflict manager 121 may check the authorization of the service request (504), validate the service request (506), and determine whether the service request has any conflicts (508).

In response to determining that there is no conflict, conflict manager 121 may instruct service manager 163 to proceed with implementing the SME service. For example, service manager 163 may process the SME service by registering the service (510). Service manager 163 sends a response to the service registration to R1 termination 152, which in turn sends the response to application 123 via R1 interface 152 (512).

Figure 5C:
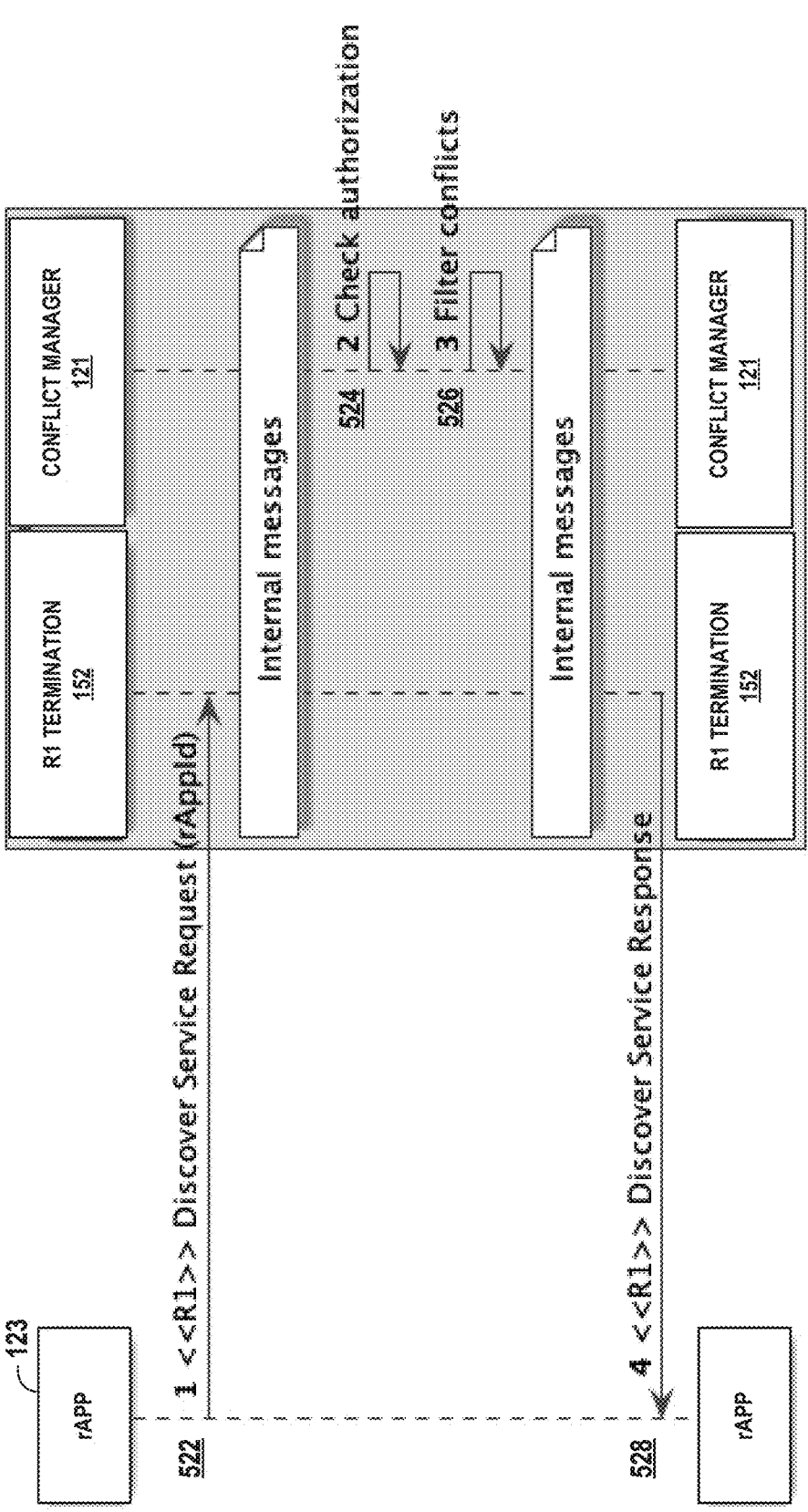
FIG. 5C is a flow diagram illustrating another example conflict management of an SME service, in accordance with one or more techniques of the disclosure.

FIG. 5C is a flow diagram illustrating another example conflict management of an SME service, in accordance with one or more techniques of the disclosure. FIG. 5C is described with respect to conflict manager 121 of FIG. 5A but may also apply to service manager 163 or any other microservice of non-RT RIC 122.

In the example of FIG. 5C, application 123 may send a request for an SME service (e.g., to discover a service request) to R1 termination 152 (522), which sends a message to conflict manager 121 to determine whether there is a conflict or not with the specified SME service. Conflict manager 121 may check the authorization of the service discovery request (524) and determine whether the service discovery request has any conflicts (526).

In response to determining that there is no conflict, conflict manager 121 may instruct service manager 163 to proceed with implementing the SME service. For example, service manager 163 may process the SME service by allowing (or not allowing) the service to be discovered. Service manager 163 sends a response to the service discovery request to R1 termination 152, which in turn sends the response to application 123 via R1 interface 152 (528).

Figure 6:
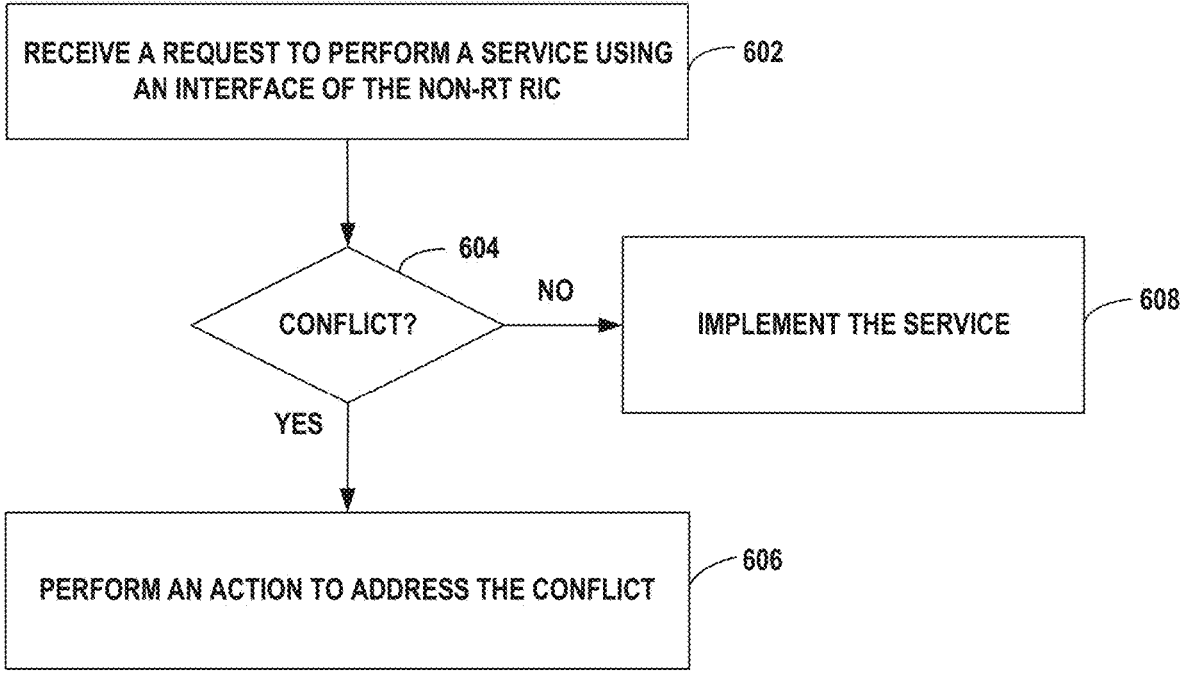
FIG. 6 is a flow diagram of an example operation of a RIC configured to perform conflict management, in accordance with the techniques described in this disclosure.

FIG. 6 is a flow diagram of an example operation of a radio access network intelligent controller (RIC) configured to perform conflict management, in accordance with the techniques described in this disclosure. The example operation 600 is described with respect to non-RT RIC 122 of FIG. 1B.

In the example of FIG. 6, non-RT RIC 122 may receive, from an application, a request to perform a service using an interface of non-RT RIC 122 (602). For example, non-RT RIC 122 may receive requests from applications 123 (e.g., requests for A1 services, O1 services, etc.) via R1 interface 154 and sends a message to conflict manager 121 to determine whether the service has a conflict.

Non-RT RIC 122 may determine whether the service has a conflict (604). For example, non-RT RIC 122 may include one or more microservices (e.g., conflict manager 121) configured to provide conflict management for services of corresponding interface(s) (e.g., A1, O1, O2 interfaces) and services available on those interface(s). In some examples, conflict manager 121 is configured to determine whether A1 services (e.g., policies) for near-RT RIC 124 from applications 123 (rApps) have conflicts. For example, conflict manager 121 may determine whether there are conflicts between the policies of applications 123 (rApps), for example, by determining whether there are contradicting and/or overlapping combinations of scope and/or policy statements (e.g., objective/resource statements). In some examples, conflict manager 121 is configured to determine whether O1 services (e.g., configuration management services, performance management services) for O-RAN managed elements from applications 123 (rApps) have conflicts. For example, conflict manager 121 may determine whether a request to provision a configuration of an O-RAN managed element (e.g., request to create or update managed object instances (MOI)) would conflict with a previous configuration of the O-RAN managed element. In some examples, conflict manager 121 is configured to determine whether O2 services (e.g., configuration management services, performance management services) for resources of O-RAN cloud from applications 123 (rApps) have conflicts. For example, conflict manager 121 may determine whether a request to provision a configuration of a resource of the O-RAN cloud would conflict with a previous configuration of the resource of the O-RAN cloud. In some examples, conflict manager 121 is configured to determine whether other services have conflict, such as SME services, DME services, AI/ML services, or other services provided by non-RT RIC 122.

In response to determining that the service has a conflict ("YES" of step 604), non-RT RIC 122 may perform an action to address the conflict (606). In some examples, conflict manager 121 may determine which of the conflicting policies to implement based on one or more conflict management rules. As one example, conflict manager 121 may implement a first come, first served rule. In this example, non-RT RIC 122 may implement the policy of a first application if the request to create the policy of the first application precedes the request to create the policy of the second application. Alternatively, or additionally, conflict manager 121 may implement a priority-based overriding rule where the policy of an application with a higher priority is implemented. For example, conflict manager 121 may implement the policy of the second application based on the second application having a higher priority than the first application. In some examples, conflict manager 121 may override a policy specifying a general scope with a policy specifying a narrower scope. For example, non-RT RIC 122 may implement a policy for a UE specific performance target over a more general policy specifying a performance target for all UEs or override the more general policy broadly applied in the case of the specific UE for the narrower policy. In some examples, an operator may configure the conflict management rule to apply for each policy statement. For example, the operator may configure the implementation of a first conflict management rule in response to the determination of a conflict with a first policy statement and configure the implementation of a second conflict management rule that is different than the first conflict management rule in response to the determination of a conflict with a second policy statement. In some examples, parameters of a network resource may be classified into different types, such as an Information Object Class (IOC), ProxyClass, and Data Type parameters. An IOC describes the information that can be used in management interfaces. The IOC includes attributes that represent the various properties of the IOC. In these examples, non-RT RIC 122 may apply a conflict management rule based on parameter or based on parameter and parameter type. In some examples, non-RT RIC 122 may provide operator-configurable conflict management rules (e.g., user can specify the type of conflict management rule to apply).

If conflict manager 121 determines there is no conflict ("NO" of step 604), conflict manager 121, non-RT RIC 122 may implement the service (608). In some examples, if conflict manager 122 determines that an A1 service (e.g., creation of a policy for near-RT RIC 124) does not have a conflict, conflict manager 121 instructs policy manager 158 of non-RT RIC 122 to proceed with the creation of the policy for near-RT RIC 124 (e.g., generate an HTTP PUT statement to create the policy and send the command to A1 termination 156, which in turn sends the command to near RT RIC 124 via A1 interface 164). In some examples, if conflict manager 121 determines that an O1 service (e.g., provisioning a configuration for an O-RAN managed element) does not have a conflict, conflict manager 121 instructs configuration manager 162 (or performance manager 160 if the request is to create or update a performance job) to proceed with the provisioning of the configuration for the O-RAN managed element (e.g., generate a command to modify MOI attributes of the O-RAN managed element and send the command to O1 termination 168, which in turn sends the command to the O-RAN managed element via O1 interface 166). In some examples, if conflict manager 121 determines that an O2 service (e.g., provisioning a configuration for a resource of the O-RAN cloud) does not have a conflict, conflict manager 121 instructs configuration manager 162 (or performance manager 160 if the request is to create or update a performance job) to proceed with the provisioning of the configuration for the resource of the O-RAN cloud (e.g., generate a command to modify configuration of physical infrastructure nodes that host O-RAN functions (e.g., virtual network functions), the supporting software components, and the appropriate management and orchestration functions, and send the command to O2 termination 169, which in turn sends the command to the resource of the O-RAN cloud via O2 interface 167).

Figure 7:
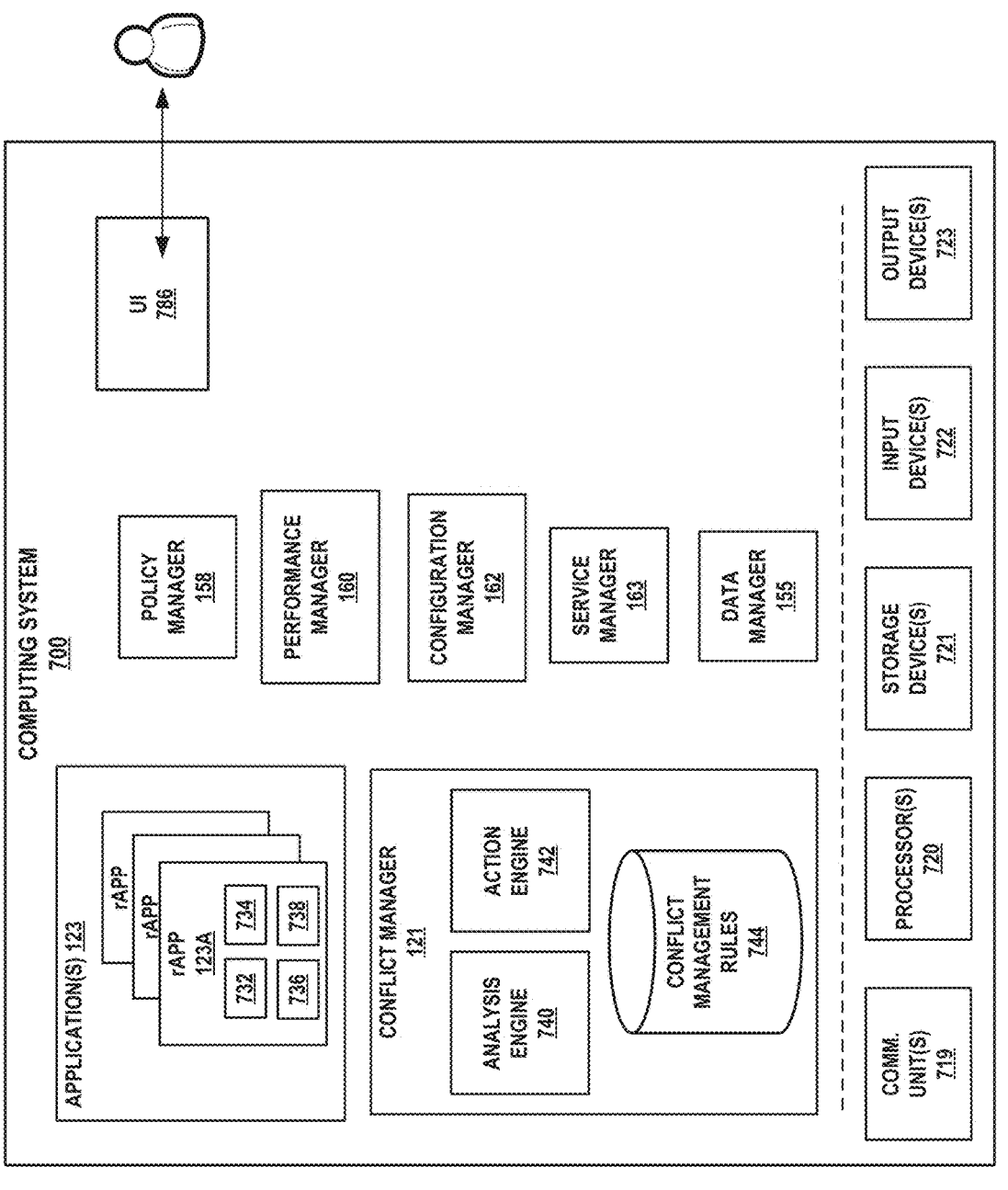
FIG. 7 is a block diagram illustrating an example computing system in detail, in accordance with the techniques of this disclosure.

FIG. 7 is a diagram illustrating an example computing system in detail, in accordance with techniques of this disclosure. In this example of FIG. 7, computing system 700 may implement, for example, a non-real time RIC, such as non-RT RIC 122 of FIGS. 1A, 1B, 2A, 3A, 4, and 5A.

Computing system 700 includes one or more processors 720, one or more input devices 722, one or more output devices 723, one or more communication units 719, and one or more storage devices 721. In some examples, computing system 700 is a cloud computing system, server farm, and/or server cluster (or portion thereof) that provides services to client devices and other devices or systems. In other examples, computing system 700 may be implemented through one or more virtualized compute instances (e.g., virtual machines, containers) of a data center, cloud computing system, server farm, and/or server cluster.

One or more of the devices, modules, storage areas, or other components of computing system 700 may be interconnected to enable inter-component communications (physically, communicatively, and/or operatively). In some examples, such connectivity may be provided by communication channels (e.g., message bus 151 of FIG. 1B), a system bus, a network connection, an inter-process communication data structure, or any other method for communicating data.

One or more processors 720 of computing system 700 may implement functionality and/or execute instructions associated with conflict management of a non-RT RIC or associated with one or more modules illustrated herein and/or described herein, including applications 123, policy manager 158, performance manager 160, configuration manager 162, service manager 163, data manager 155, and conflict manager 121. One or more processors 720 may be, may be part of, and/or may include processing circuitry that performs operations in accordance with one or more aspects of the present disclosure. Examples of processors 720 include microprocessors, application processors, display controllers, auxiliary processors, one or more sensor hubs, and any other hardware configured to function as a processor, a processing unit, or a processing device. Computing system 700 may use one or more processors 720 to perform operations in accordance with one or more aspects of the present disclosure using software, hardware, firmware, or a mixture of hardware, software, and firmware residing in and/or executing at computing system 700. Any one or more of applications 123, policy manager 158, performance manager 160, configuration manager 162, service manager 163, data manager 155, and conflict manager 121 may be hosted by a cloud provider or other third-party.

One or more communication units 719 of computing system 700 may communicate with devices external to computing system 700 by transmitting and/or receiving data, and may operate, in some respects, as both an input device and an output device. In some examples, communication units 719 may communicate with other devices over a network. In other examples, communication units 719 may send and/or receive radio signals on a radio network such as a cellular radio network. In other examples, communication units 719 of computing system 700 may transmit and/or receive satellite signals on a satellite network such as a Global Positioning System (GPS) network. Examples of communication units 719 include a network interface card (e.g., an Ethernet card), an optical transceiver, a radio frequency transceiver, a GPS receiver, or any other type of device that can send and/or receive information. Other examples of communication units 719 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 722 may represent any input devices of computing system 700 not otherwise separately described herein. One or more input devices 722 may generate, receive, and/or process input from any type of device capable of detecting input from a human or machine. For example, one or more input devices 722 may generate, receive, and/or process input in the form of electrical, physical, audio, image, and/or visual input (e.g., peripheral device, keyboard, microphone, camera).

One or more output devices 723 may represent any output devices of computing system 700 not otherwise separately described herein. One or more output devices 723 may generate, receive, and/or process input from any type of device capable of detecting input from a human or machine. For example, one or more output devices 723 may generate, receive, and/or process output in the form of electrical and/or physical output (e.g., peripheral device, actuator).

One or more storage devices 721 within computing system 700 may store information for processing during operation of computing system 700. Storage devices 721 may store program instructions and/or data associated with one or more of the modules described in accordance with one or more aspects of this disclosure. One or more processors 720 and one or more storage devices 721 may provide an operating environment or platform for such modules, which may be implemented as software, but may in some examples include any combination of hardware, firmware, and software. One or more processors 720 may execute instructions and one or more storage devices 721 may store instructions and/or data of one or more modules. The combination of processors 720 and storage devices 721 may retrieve, store, and/or execute the instructions and/or data of one or more applications, modules, or software. Processors 720 and/or storage devices 721 may also be operably coupled to one or more other software and/or hardware components, including, but not limited to, one or more of the components of computing system 700 and/or one or more devices or systems illustrated as being connected to computing system 700.

In some examples, one or more storage devices 721 are temporary memories, meaning that a primary purpose of the one or more storage devices is not long-term storage. Storage devices 721 of computing system 700 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Storage devices 721, in some examples, also include one or more computer-readable storage media. Storage devices 721 may be configured to store larger amounts of information than volatile memory. Storage devices 721 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Computing system 700 may provide conflict management for the specific applications 123. As described above, applications 123 may manage non-real time events within non-RT RIC 122, such as events that do not require response times of less than one second. Applications 123 may leverage the functionality exposed via a non-RT RIC framework of computing device 700. Applications 123 may be used to control and manage RAN elements and resources, such as a near-RT RIC, RAN nodes, and/or resources in the O-RAN cloud. Applications 123 may provide one or more services that are performed using interfaces of computing system 700 (e.g., A1 interface, O1 interface, O2 interface, etc.). For example, applications 123 may include services such as policies 732 for a near-RT RIC, configuration instructions 734 for O-RAN managed elements, performance jobs 736 for O-RAN managed elements, services for managing the services and/or data 738, etc.

Computing system 700 may include one or more modules or units configured to perform one or more services or functions of applications 123, such as policy manager 158, performance manager 160, configuration manager 162, service manager 163, data manager 155, and conflict manager 121, as described above.

For example, policy manager 158 is configured to control the deployment of policies (using, e.g., A1 services). For example, policy manager 158 may receive requests for A1 services from applications 123 (e.g., via R1 interface 154 of FIG. 1B), process the requests for A1 services from applications 123, and perform the A1 services for a near-RT RIC using an A1 interface (e.g., A1 interface 164 of FIG. 1B). In some examples, the A1 interface may implement an A1AP application protocol based on the 3GPP framework.

Performance manager 160 is configured to control the deployment of O1 services for monitoring the performance of O-RAN managed elements (e.g., near-RT RIC 124, O-CU 146, O-DU 148 of FIG. 1B). For example, performance manager 160 may receive requests for O1 services for monitoring the performance of the near-RT RIC from applications 123 (e.g., via R1 interface 154 of FIG. 1B), process the O1 services, and perform the O1 services for the O-RAN managed elements using an O1 interface (e.g., O1 interface 166 of FIG. 1B). In some examples, the O1 interface may implement REST/HTTPS APIs and/or NETCONF. Performance manager 160 may also be configured to control the deployment of O2 services for monitoring the performance of resources of the O-RAN cloud. For example, performance manager 160 may receive requests for O2 services for monitoring the performance of resources within the O-RAN cloud (e.g., via R1 interface 154 of FIG. 1B), process the requests for O2 services, and may perform the O2 services for the resources of the O-RAN cloud using an O2 interface (e.g., O2 interface 167 of FIG. 1B).

Configuration manager 162 is configured to control the deployment of O1 services for the configuration of near-RT RIC 124 and/or RAN nodes. For example, configuration manager 162 may receive requests for O1 services for the configuration of O-RAN managed elements from applications 123 (e.g., via R1 interface 154 of FIG. 1B), process the request for O1 services, and may perform the O1 services for the O-RAN managed elements using an O1 interface (e.g., O1 interface 166 of FIG. 1B). Configuration manager 162 may also be configured to control the deployment of O2 services for the configuration of resources of the O-RAN cloud. For example, configuration manager 162 may receive requests for O2 services for configuring resources within the O-RAN cloud from applications 123 (e.g., via R1 interface 154 of FIG. 1B), process the O2 services, and may perform the O2 services for the resources of the O-RAN cloud using an O2 interface (e.g., O2 interface 167 of FIG. 1B).

Service manager 163 is configured to manage services, such as registration of a service, update of a service registration, service discovery, etc. For example, service manager 163 may receive requests for SME services from applications 123 (e.g., via R1 interface 154 of FIG. 1B), perform the SME service (e.g., register/update a service) for one or more applications 123 and send a response to the one or more applications 123 using an R1 interface (e.g., R1 interface 154 of FIG. 1B).

Data manager 155 is configured to manage the data of applications 123. For example, data manager 155 may receive requests for DME services from applications 123 (e.g., via R1 interface 154 of FIG. 1B), perform the DME services (e.g., sending data from application configured as a data producer to application configured as a data consumer) for one or more applications 123, and send a response to the one or more applications 123 using an R1 interface (e.g., R1 interface 154 of FIG. 1B).

Computing system 700 includes conflict manager 121 configured to provide conflict management of services performed using interfaces of the non-RT RIC. In this example, conflict manager 121 includes an analysis engine 740, and action engine 742, and one or more conflict management rules 744.

In some examples, analysis engine 740 is configured to determine whether there are contradicting and/or overlapping combinations of scope and/or policy statements (e.g., objective/resource statements) of A1 services performed using the A1 interface. In some examples, analysis engine 740 is configured to determine whether requests to configure one or more O-RAN managed elements performed using the O1 interface or one or more resources of the O-RAN cloud performed using the O2 interface would cause a conflict (e.g., conflicting MOIs). In some examples, analysis engine 740 is configured to determine whether requests for performance jobs for one or more O-RAN managed elements performed using the O1 interface or one or more resources of the O-RAN cloud performed using the O2 interface would cause a conflict (e.g., overlapping IOCs and attributes, contradicts attribute value changes, specify different data networks, etc.). In some examples, analysis engine 740 is configured to determine whether requests to manage services performed using the R1 interface would cause a conflict (e.g., conflict with previously registered services or previously implemented application).

In response to determining that the service has a conflict, action engine 742 is configured to address the determined conflict. For example, action engine 742 may implement the services based on one or more conflict management rules 744. As described above, the conflict management rules 744 may include, for example, implementing a policy based on a first come, first served basis, implementing a policy from the application with a higher priority, implementing a policy based on scope of the policy, implementing a policy based on an IOC type or based on an IOC type and attribute of the IOC.

In some examples, a user may specify which conflict management rule to apply to address the conflict via user interface module (UI) 786. UI module 786 may generate data indicative of various user interface screens that graphically depict the conflict management rules UI module 786 can output, e.g., for display by a separate display device, the data indicative of the various user interface screens. UI module 786 can also output, for display, data indicative of graphical user interface elements that solicit input. Input may be, for example, a conflict management rule to be applied to a particular service, queries, or other input.

In accordance with the techniques of this disclosure, conflict manager 121 may interact with UI 786 to display information to the user by generating user interfaces for displaying output data on output device(s) 723 and to receive input data from the user via input device(s) 721.

Figure 8:
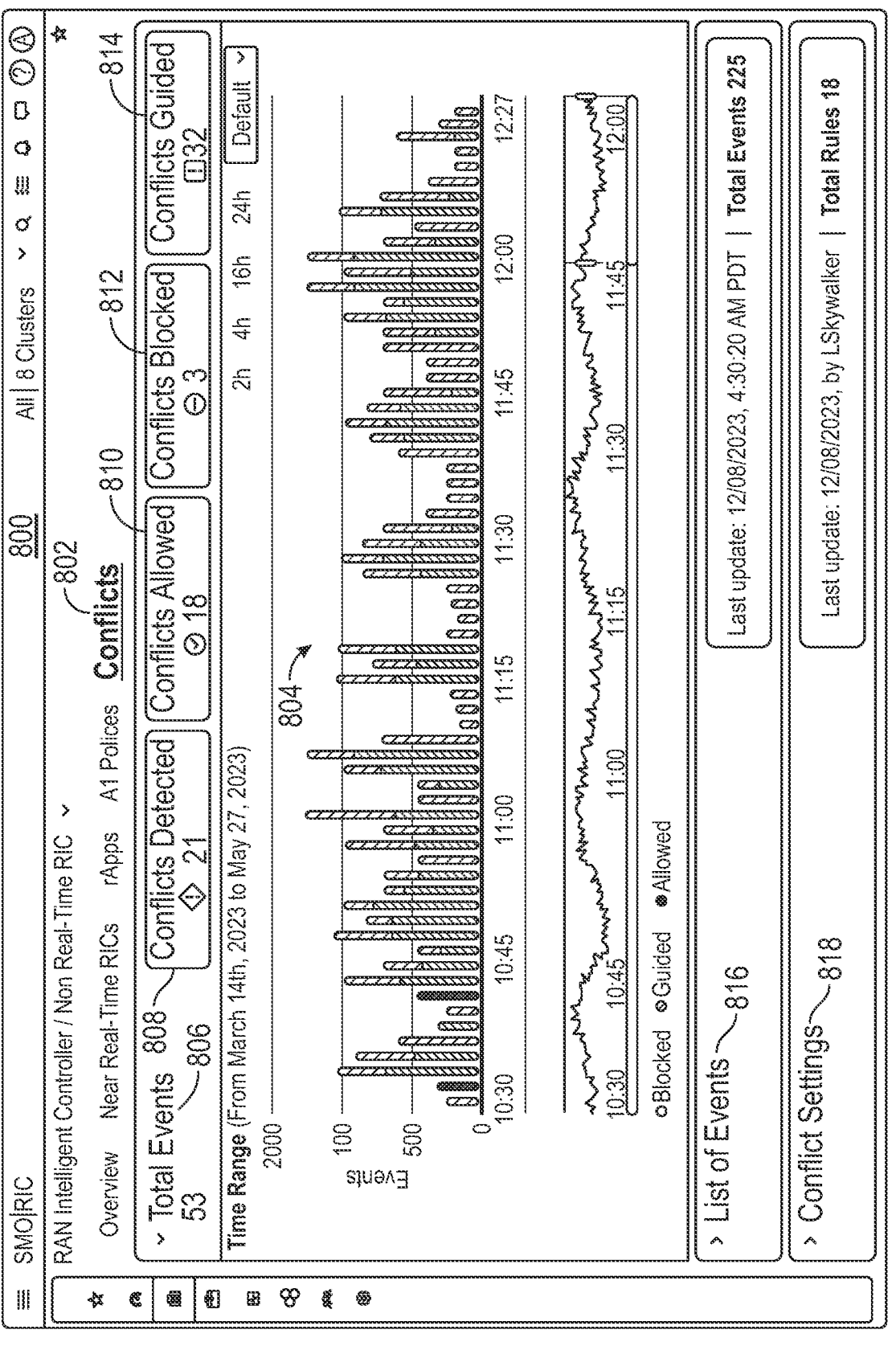
FIG. 8 is an example of a user interface displaying conflicts in accordance with the techniques described in this disclosure.

In some examples, conflict manager 121 (using UI 786) may provide the capability for the user to view captured A1 policy conflicts and their conflict resolution strategies. FIG. 8 is an example of a user interface 800 displaying conflicts in accordance with the techniques described in this disclosure. User interface 800 includes a conflicts 802 tab. When the conflicts 802 tab is selected, conflict manager 121 generates display 800 to show a summary of existing events (e.g., conflict events) and a graphical chart 804. In this example, user interface 800 shows a total number of events 806, a number of conflicts detected 808, a number of conflicts allowed 810, a number of conflicts blocked 812, and a number of conflicts guided 814. In this example, graphical chart 804 shows a temporal conflict events graph with a number of events on the y-axis and numbers of blocked conflicts, guided conflicts and allowed conflicts on the x-axis over a period of time. User interface 800 also shows a list of events 816 selection and a conflict settings 818 selection.

Conflict manager 121 (using UI 786) may provide the capability for the user to view conflict related events by selection of list of events 816. FIG. 9 is an example of a user interface 900 of list of events 816 in accordance with the techniques described in this disclosure. In this example, the columns of the conflict events list view include events type 902, having allowed values of A1-P Guidance Request, A1-P Guidance Response, A1-P Conflict Detection, and A1-P Conflict Resolution; time raised 904, showing a time in human readable format; source rApp 906, showing an rApp name (which may include a hyperlink to a filtered rApps display), rule ID 908, showing a rule ID (which when hovered, may show an A1 policy type, a conflict resolution strategy and rApp priority information); outcome 910, showing allowed values of Allowed, Blocked, or Guided; and description 912, showing example allowed values of "A1-P conflict guidance request message received from an rApp", "A1-P conflict guidance response message sent to an rApp", "Detected an A1-P conflict", and "Resolved the A1-P conflict." For example, the events list view may show all conflict events that have occurred within a time period such as a month (e.g., sorted by latest to oldest by default). Conflict manager 121 may support filtering of events list in user interface 900 with respect to each column.

Conflict manager 121 (using UI 786) may provide the capability for the user to view A1-P guidance request and response messages generated by rApps. Conflict manager 121 may enable display of A1-P request response messages when generated on an Events and Logs display (not shown in FIG. 9), and the messages may be filtered for display. Conflict manager 121 (using UI 786) may also provide the capability for the user to monitor A1 events, in real-time and/or historically. Conflict manager 121 may enable display of A1-P conflict events (when generated) on the Events and Logs display, and the A1-P conflict events may be filtered for display.

Conflict manager 121 may provide the capability for the users to view details of a selected event. For example, the user may select an item in the events type 902 list, and in response conflict manager 121 (using UI 786) displays information about the selected event. FIG. 10 is an example of a user interface 1000 displaying information about a selected event in accordance with the techniques described in this disclosure. In this example, event details 1002 shows additional information about the selected event. In an example (as shown in FIG. 10), when the event type 1004 is A1 Policy (A1-P) guidance request 1006, event details 1002 may show a category 1008, type (e.g., event type 1004), component 1010 (e.g., conflict manager 121), description 1012, time 1014, source rAPP 1016, A1 policy type 1018, target near-RT RIC 1020, and A1-P policy guidance request message contents 1022.

In another example, when the event type is A1-P guidance response, event details 1002 may show category 1008, type (e.g., event type 1004), component 1010, description 1012, time 1014, source rAPP 1016, A1 policy type 1018, target near-RT RIC 1020, and A1-P policy guidance response message contents.

In another example, when the event type is A1-P conflict detection, event details may show category 1008, type 1004, component 1010, description 1012, time 1014, and information related to the A1-P create/update operation that generated the conflict, such as source rApp (e.g., the rAPP that generated the A1-P conflict with A1-P create/update), A1 policy type, target near-RT RIC, A1-P create/update time, and A1 policy contents, and information related to the conflicting A1-P that has been generated previously, such as conflicting rApp (e.g., the rApp that generated the A1-P with which the new A1-P conflicts), A1 policy type, target near-RT RIC, A1-P create/update time, and A1 policy contents.

In a further example, when the event type is A1-P conflict resolution, event details may show category 1008, type 1004, component 1010, description 1012, time 1014, rule ID, applied resolution strategy (ALLOW, First Come First Served (FCFS), or Policy-Based Overriding (PBO)), resolution outcome (ALLOWED/BLOCKED), and information related to the A1-P create/update operation that generated the conflict, such as source rApp (e.g., the rAPP that generated the A1-P conflict with A1-P crate/update), A1 policy type, target near-RT RIC, A1-P create/update time, and A1 policy contents, and information related to the conflicting A1-P that has been generated previously, such as conflicting rApp (e.g., the rApp that generated the A1-P which the new A1-P conflicts with), A1 policy type, target near-RT RIC, A1-P create/update time, and A1 policy contents.

Figure 11:
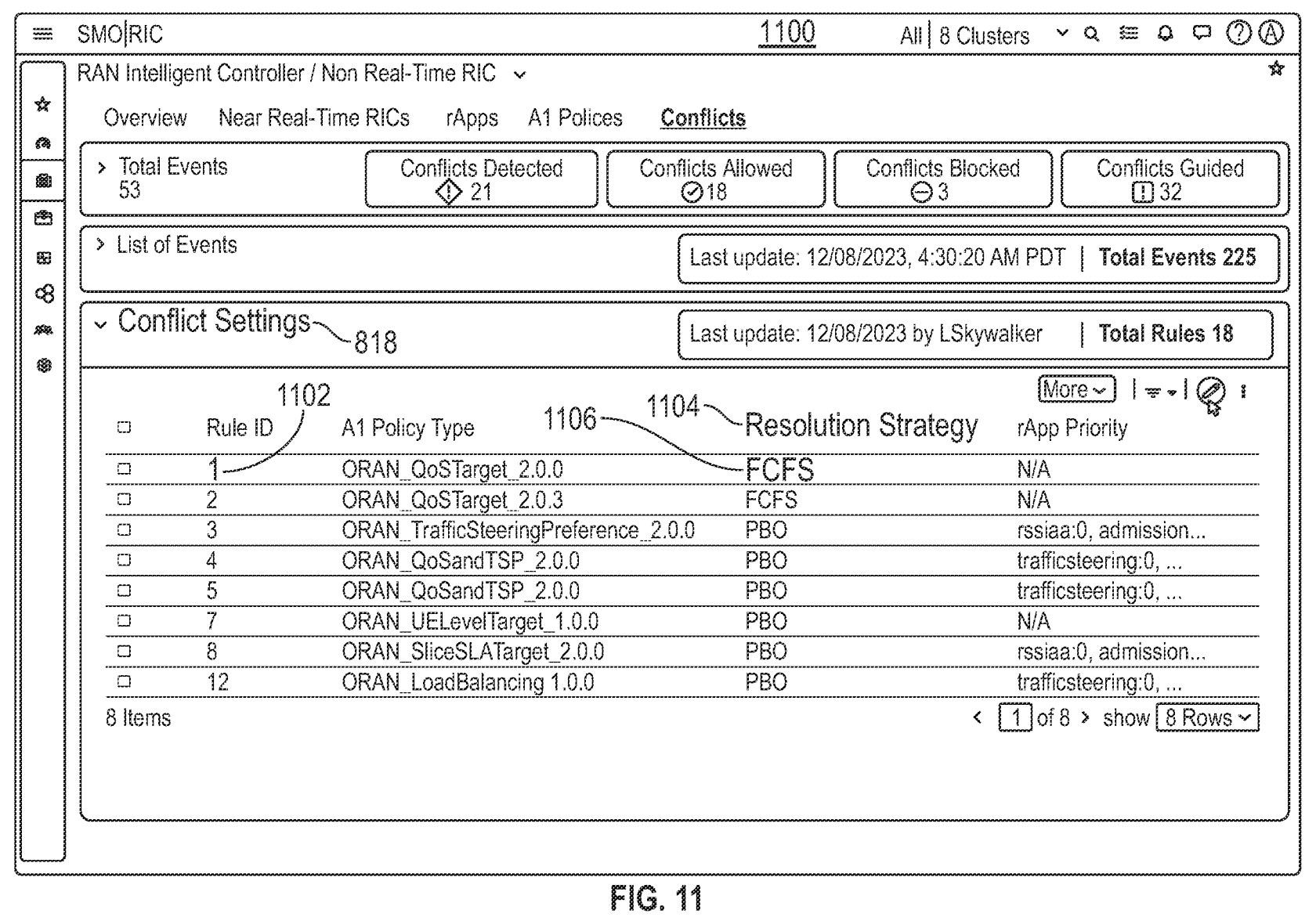

Conflict manager 121 (using UI 786) may provide the capability for the user to view a summary of conflict resolution settings by selection of conflict settings 818 of FIG. 8. FIG. 11 is an example of a user interface 1100 displaying conflict settings in accordance with the techniques described in this disclosure. The user may view the rules available by default, as automatically populated by non-RT RIC 122.

In some examples, conflict manager 121 (using UI 786) may provide the capability for the user to configure conflict resolution strategies for non-RT RIC 122, to view a summary of selected conflict resolution settings, to edit selected conflict resolution settings, and select conflict resolutions. In some examples, the possible conflict resolution strategies to be displayed include ALLOW, FCFS, and PBO. Conflict manager 121 may also provide the capability for the user to view helper text on output device(s) 723 to understand what each strategy does. Conflict manager 121 may further provide the capability (using UI 786) for the user to select a conflict resolution to be applied to ALL A1 POLICY TYPES or PER EACH A1 POLICY TYPE. If ALL A1 POLICY TYPES is selected by the user, then conflict manager 121 may allow the user to be able to select only the conflict resolution strategy (as either ALLOW, FCFS or PBO). If PER EACH A1 POLICY TYPE is selected, then conflict manager 121 may allow the user to be able to select the conflict resolution strategy (as either ALLOW, FCFS or PBO) for each supported A1 policy type (e.g., specified by a PolicyTypeId) shown in the conflict management settings display 1100 (for example, including possible supported A1 policy types per A1 type definitions as described, for example, in "ORAN Working Group (WG) 2 (Non-RT RIC and A1 Interface WG) A1 Interface: Type Definitions", O-RAN.WG2.A1TD-R003-v06.00, October 2023, or other versions and having sections referenced below).

In an example, the following A1 type definitions may be supported.

ORAN_QoSTarget_2.0.0 (which may be used for QOS Target, as described in section 7.2.1 of A1 Interface: Type Definitions).

ORAN_QoETarget_2.0.0 (which may be used for QoE Target, as described in section 7.2.2 of A1 Interface: Type Definitions).

ORAN_TrafficSteeringPreference_2.0.0 (which may be used for Traffic Steering preferences, as described in section 7.2.3 of A1 Interface: Type Definitions).

ORAN_QoSandTSP_2.0.0 (which may be used for QoS optimization with resource directive, as described in section 7.2.4 of A1 Interface: Type Definitions).

ORAN_QoEandTSP_2.0.0 (which may be used for QoE optimization with resource directive, as described in section 7.2.5 of A1 Interface, Type Definitions).

ORAN_UELevelTarget_1.0.0 (which may be used for UE level target, as described in section 7.2.6 of A1 Interface: Type Definitions).

ORAN_SliceSLATarget_2.0.0 (which may be used for Slice SLA target, as described in section 7.2.7 of A1 Interface: Type Definitions).

ORAN_LoadBalancing 1.0.0 (which may be used for Load balancing, as described in section 7.2.8 of A1 Interface: Type Definitions).

In other examples, other A1, O1, O2 and/or SME type definitions may also be supported.

Conflict manager 121 (using UI 786) may also provide the capability for the user to define a new priority for each onboarded rApp if Priority-based Overriding (PBO) is selected as the conflict resolution strategy.

Figure 12:
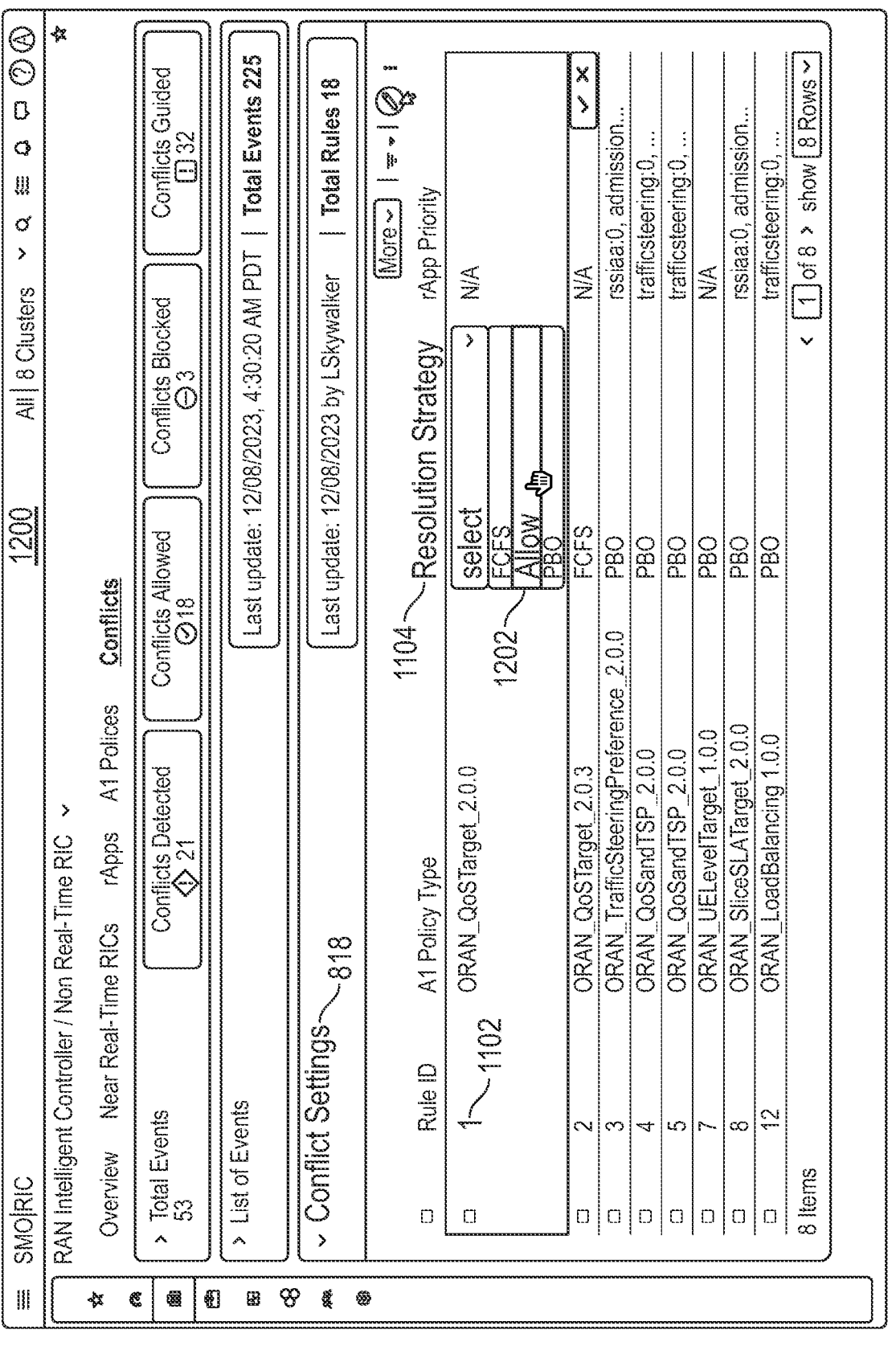
FIG. 12 is an example of a user interface displaying editing of a conflict setting in accordance with the techniques described in this disclosure.
Figure 13:
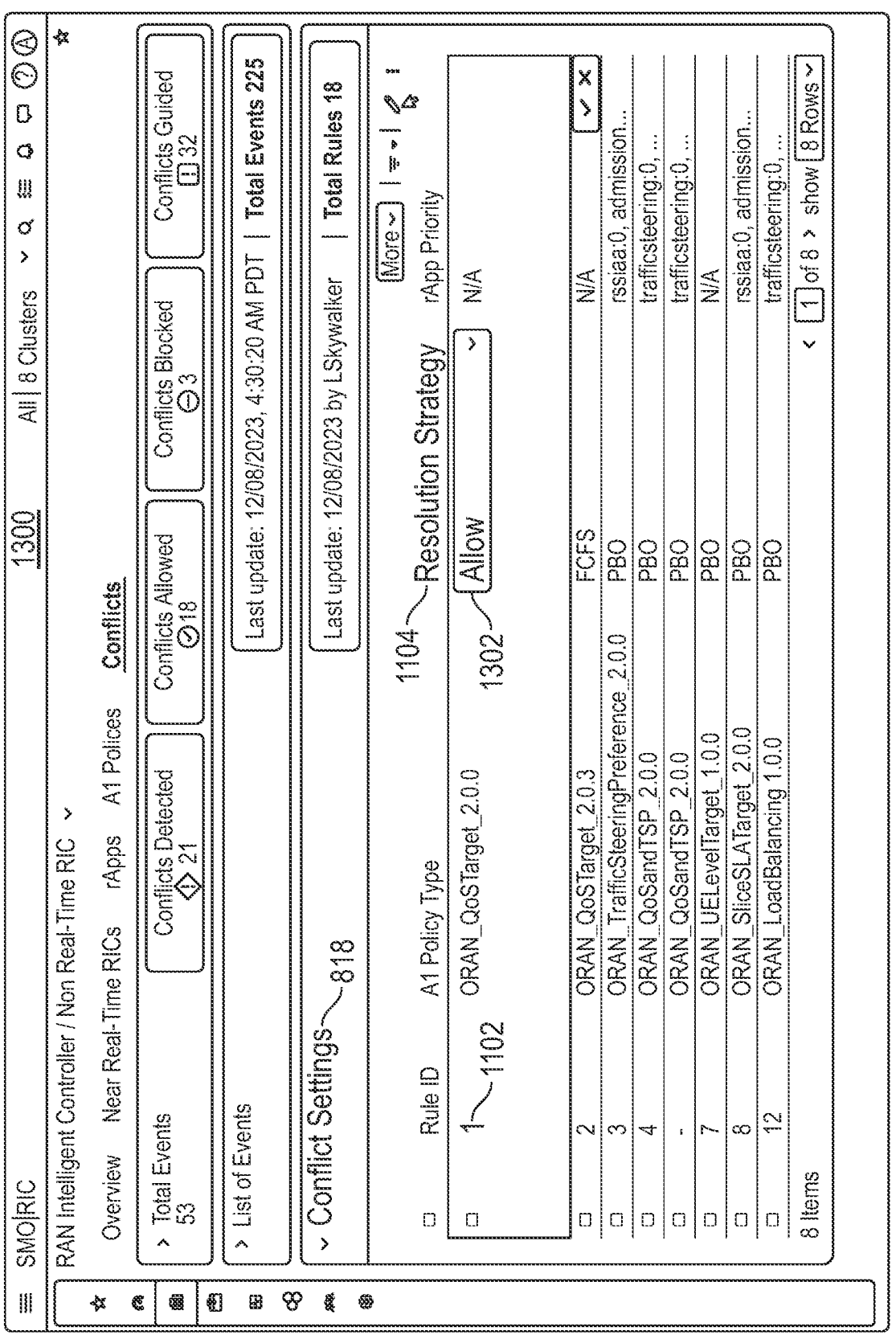
FIG. 13 is an example of a user interface displaying an edited conflict setting in accordance with the techniques described in this disclosure.

Conflict manager 121 may provide the capability for the user to select a rule and edit a corresponding conflict resolution setting (with no deletion of a rule being allowed, in one implementation). For example, as shown in FIG. 11, the user may select an item in the conflict settings 818 list (such as rule ID 1 1102). In this example, the resolution strategy 1104 for rule ID 1 1102/RAN interface policy type is currently FCFS 1106. FIG. 12 is an example of a user interface 1200 displaying editing of a conflict setting in accordance with the techniques described in this disclosure. Conflict manager 121 may accept a selection by the user to set the resolution strategy 1104 for rule ID 1 1102 to ALLOW 1202 (e.g., using a drop down menu). In response to an indication of the selection at user interface 1100, conflict manager 121 changes the resolution strategy 1104 for rule ID 1 1102 accordingly within conflict manager 121 and performs any necessary conflict resolution processing as described above with respect to FIGS. 1-5 relating to this change of resolution strategy configured by the user (including determining if a conflict exists due to the change in resolution strategy). FIG. 13 is an example of a user interface 1300 displaying an edited conflict setting in accordance with the techniques described in this disclosure. If conflict manager 121 determines that the selection of the new resolution strategy of ALLOW for the selected rule/RAN interface policy type does not create a conflict, then conflict manager 121 (using UI 786) shows resolution strategy 1104 of rule ID 1 1102 as having the value of ALLOW 1302.

FIG. 14 is another example of a user interface 1400 displaying conflict settings in accordance with the techniques described in this disclosure. In this example, as shown in FIG. 14, the user may select an item in the conflict settings 818 list (such as rule ID 1 1102). In this example, the resolution strategy 1104 for rule ID 1 1102 may be set by the user to PBO 1402 (e.g., using a drop-down menu) as shown in FIG. 12. Conflict manager 121 may accept the selection by the user to change the resolution strategy 1104 for rule ID 1 1102 to PBO 1402. In response, conflict manager 121 changes the resolution strategy 1104 for rule ID 1 1102 accordingly within conflict manager 121 and performs any necessary conflict resolution processing as described above with respect to FIGS. 1-5 relating to this change of resolution strategy configured by the user (including determining if a conflict exists due to the change in resolution strategy). Further, conflict manager 121 displays rApp priority settings 1404 corresponding to the PBO resolution strategy (e.g., for Admission Control, Trafficsteering, and Rssiaa applications (e.g., rApps)).

Figure 15:
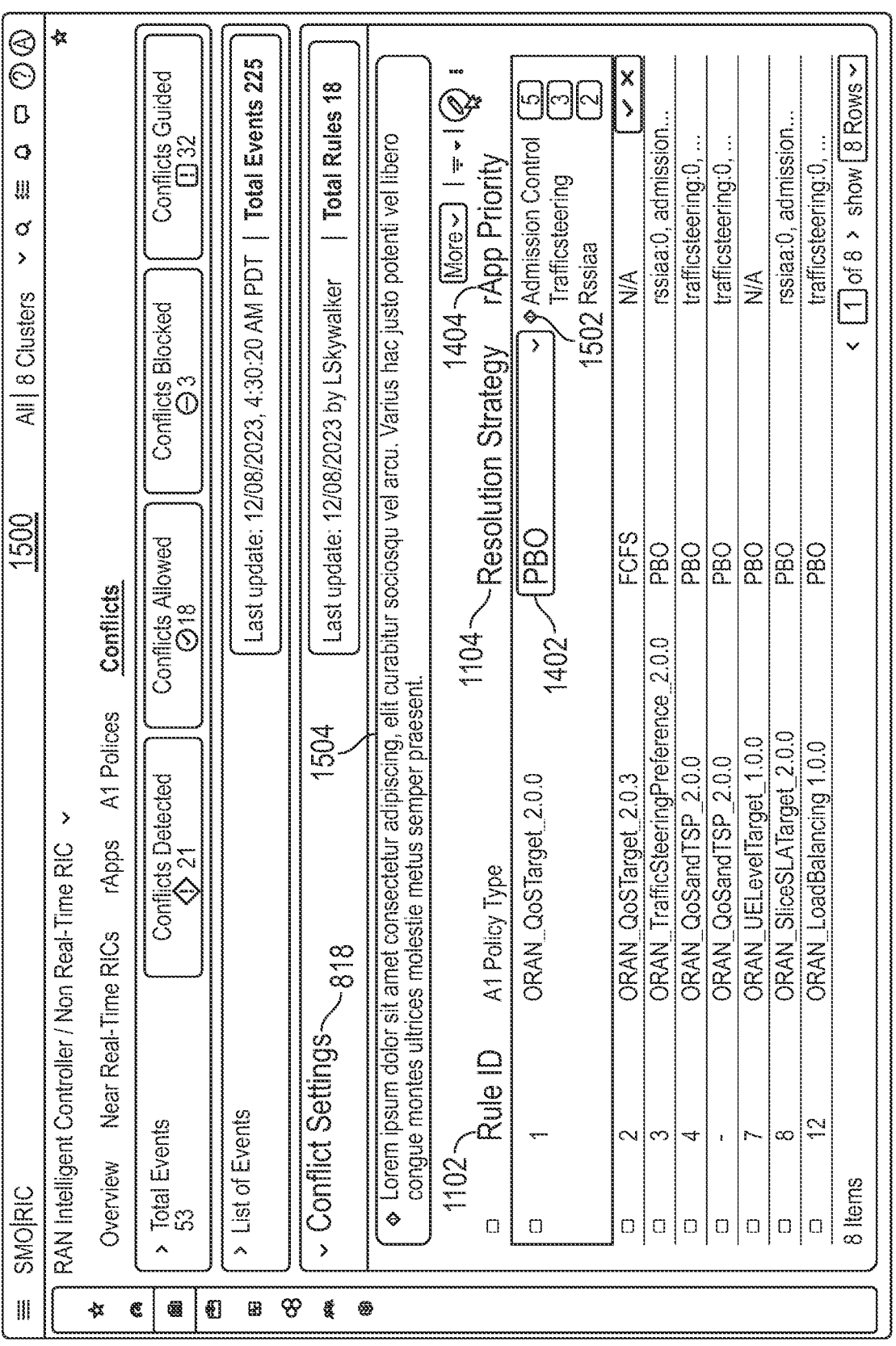
FIG. 15 is an example of a user interface displaying an edited conflict setting and conflict information in accordance with the techniques described in this disclosure.

FIG. 15 is an example of a user interface 1500 displaying an edited conflict setting and conflict information in accordance with the techniques described in this disclosure. If this change in resolution strategy 1104 causes a conflict as determined by conflict manager 121, the conflict may be highlighted to the user (for example, as indicated by the "!" symbol 1502). Conflict manager 121 (using UI 786) now shows resolution strategy 1104 of rule ID 1 1102 as having the value of PBO 1402, rApp priority settings 1404 (e.g., for Admission Control, Trafficsteering, and Rssiaa applications (example rApps)), and conflict information 1504 informing the user of the conflict created by the new resolution strategy setting. In response, the user may then further edit the resolution strategy 1104 for rule ID 1 1102 to remove the conflict.

Figure 16:
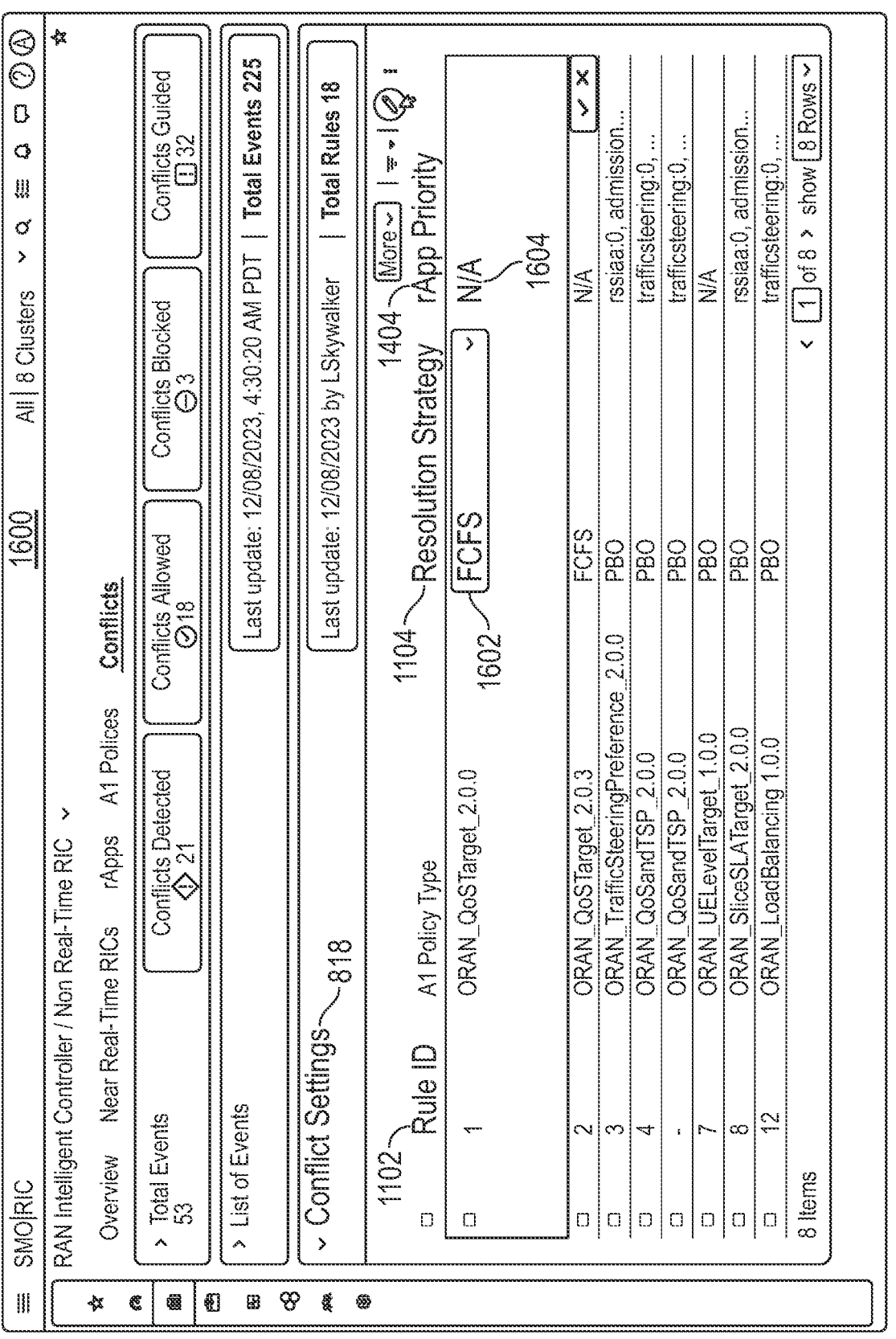
FIG. 16 is another example of a user interface displaying conflict settings in accordance with the techniques described in this disclosure.

FIG. 16 is another example of a user interface 1600 displaying conflict settings in accordance with the techniques described in this disclosure. In this example, as shown in FIG. 16, the user may select an item in the conflict settings 818 list (such as rule ID 1 1102). In this example, the resolution strategy 1104 for rule ID 1 1102 may be set by the user to FCFS 1602 (e.g., using a drop-down menu) as shown in FIG. 12. Conflict manager 121 may accept the selection by the user to change the resolution strategy 1104 for rule ID 1 1102 to FCFS 1602. In response, conflict manager 121 changes the resolution strategy 1104 for rule ID 1 1102 accordingly within conflict manager 121 and performs any necessary conflict resolution processing as described above with respect to FIGS. 1-5 relating to this change of resolution strategy configured by the user (including determining if a conflict exists due to the change in resolution strategy). Conflict manager 121 may also display the rApp priority 1404 of "N/A" 1604 corresponding to a resolution strategy 1104 of FCFS 1602.

FIGS. 13, 14, and 16 illustrate three different settings for resolution strategy 1104 for sample rule ID 1 1102. After resolution strategy 1104 (either ALLOW, FCFS or PBO) is set for sample rule ID 1 1102 and no conflicts have arisen due to the change, conflict manager 121 may update the display of conflict settings 818 to reflect the change of resolution strategy.

Figure 17:
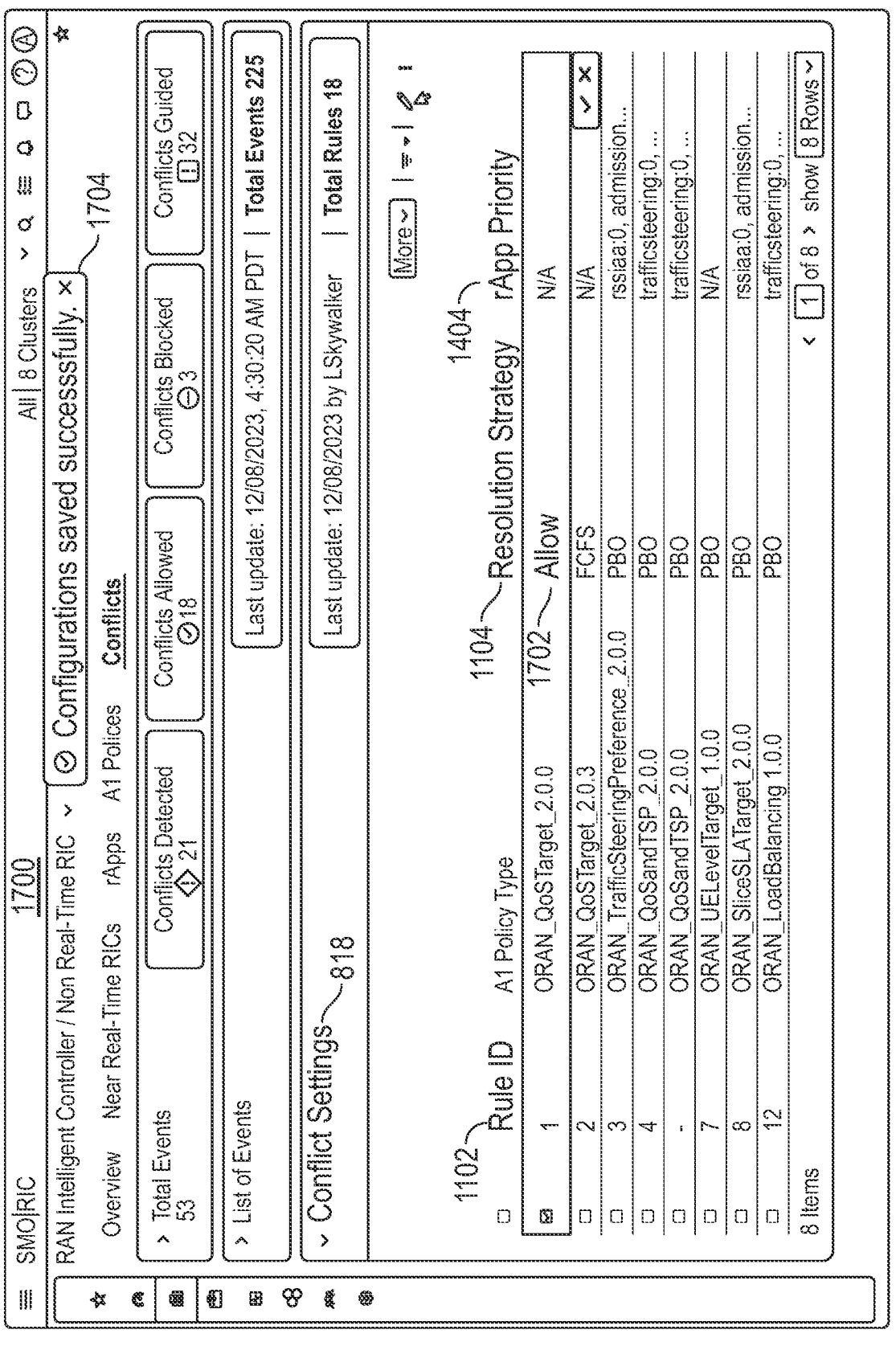
FIG. 17 is another example of a user interface displaying conflict settings in accordance with the techniques described in this disclosure.

FIG. 17 is another example of a user interface 1700 displaying conflict settings in accordance with the techniques described in this disclosure. In an example where resolution strategy 1104 has been set to ALLOW (as shown in FIG. 13), conflict manager 121 may show the ALLOW status 1702 for resolution strategy 1104 of rule ID 1 1102 on user interface 1700 if no conflict is detected. Additionally, conflict manager 121 may show an indication 1704 ("Configuration saved successfully") that the change has been made successfully.

Although the examples of FIGS. 8-17 illustrate handling A1 policy types for A1 services, similar processing may be performed by conflict manager 121 for O1 services, O2 services, and SME services (e.g., over an R1 interface).

Figure 18:
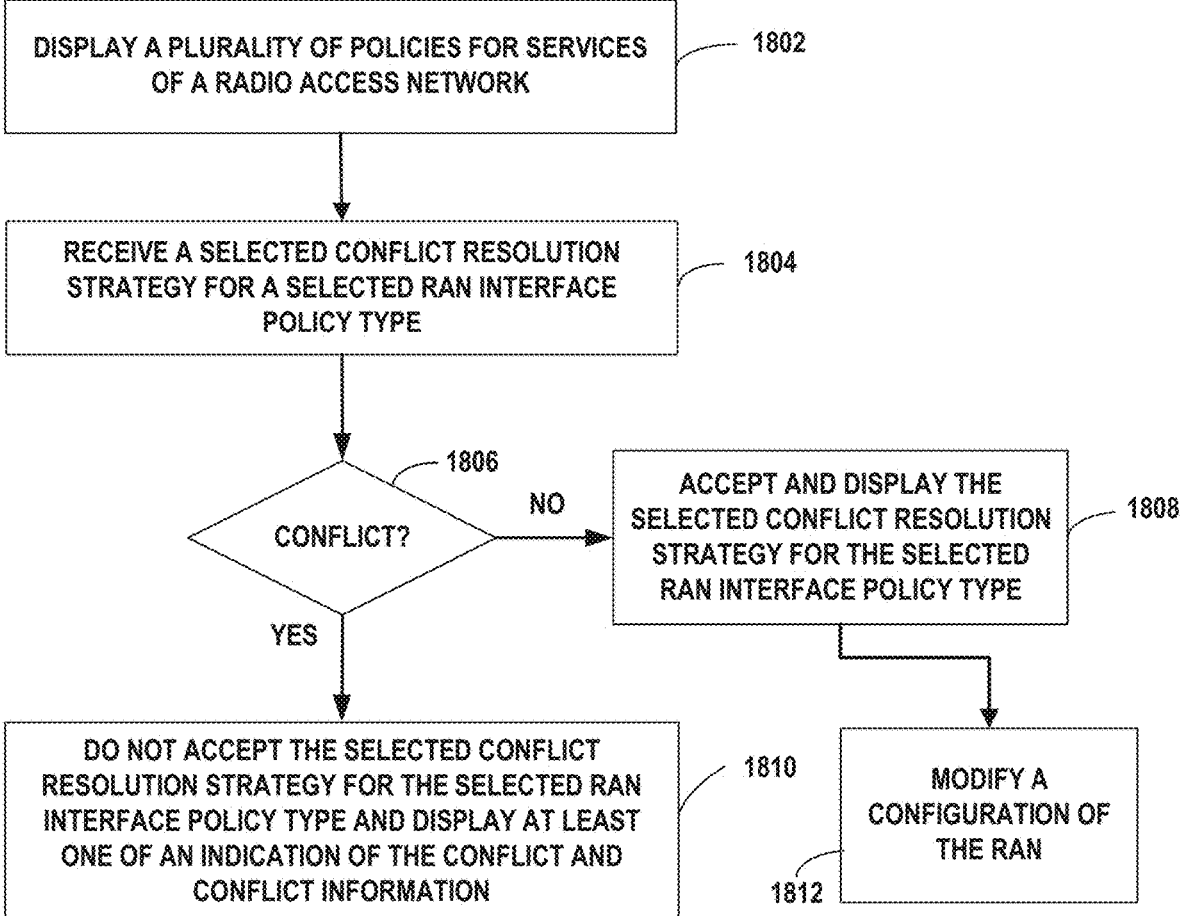
FIG. 18 is a flow diagram of an example operation of a RIC configured to perform conflict management for an interface service using a user interface, in accordance with the techniques described in this disclosure.

FIG. 18 is a flow diagram of an example operation of a RIC configured to perform conflict management for an interface service using a user interface, in accordance with the techniques described in this disclosure.

At block 1802, conflict manager 121 displays a plurality of policies for respective policy types for an interface service of the RAN.

At block 1804, conflict manager 121 receives a selected conflict resolution strategy for a selected RAN interface policy type.

At block 1806, conflict manager 121 determines whether a service of the RAN has a conflict with the selected conflict resolution strategy for the selected RAN interface policy type.

At block 1808, when the selected conflict resolution strategy for the selected RAN interface policy type does not have the conflict (NO branch of 1806), conflict manager 121 accepts the selected conflict resolution strategy for the selected RAN interface policy type and displays the selected conflict resolution strategy for the selected RAN interface policy type. At block 1812, a configuration of the RAN is modified at least in part based on the selected conflict resolution strategy.

At block 1810, when the selected conflict resolution strategy has the conflict (YES branch of 1806), conflict manager 121 does not accept the selected conflict resolution strategy for the selected RAN interface policy type and displays at least one of an indication of the conflict and conflict information.

Thus, conflict manager 121 (using UI 786) may receive indications of selected conflict resolution strategies for policies from a user, determine whether services of the RAN have conflicts with the selected conflict resolution strategies, and output indications to the user when conflicts occur, so the user may take corrective action.

The following are examples of the described techniques.

Example 1: A Radio Access Network Intelligent Controller (RIC) for a radio access network (RAN) includes processor circuitry; and a memory coupled to the processor circuitry, the memory storing instructions, when executed, to cause the processor circuitry to: display a plurality of policies for an interface service of the RAN; receive an indication of selection of a conflict resolution strategy for a selected RAN interface policy type; determine whether the interface service of the RAN has a conflict based on the selected conflict resolution strategy for the selected RAN interface policy type; when the interface service does not have the conflict, accept the selected conflict resolution strategy for the selected RAN interface policy type and display an indication of the selected conflict resolution strategy for the selected RAN interface policy type; and based on the selected conflict resolution strategy for the selected RAN interface policy type, modify a configuration of the RAN.

Example 2: The RIC of example 1, further includes when the interface service has the conflict, do not accept the selected conflict resolution strategy for the selected RAN interface policy type and display at least one of an indication of the conflict and conflict information.

Example 3: The RIC of any of examples 1 and 2, wherein the indication of the selection of the conflict resolution strategy is received from a user by a user interface of the RIC.

Example 4: The RIC of any of examples 1 through 3, wherein the selected conflict resolution strategy comprises one of allow, first come first served, and policy-based overriding.

Example 5: The RIC of example 4, wherein when the selected conflict resolution strategy is policy-based overriding, the instructions, when executed, further cause the processing circuitry to display a priority of a plurality of applications and the indication of the conflict indicates at least one of the plurality of applications causing the conflict.

Example 6: The RIC of example 5, wherein when the selected conflict resolution strategy is policy-based overriding, the instructions, when executed, further cause the processing circuitry to receive a new priority for at least one of the plurality of applications.

Example 7: The RIC of any of examples 1 through 6, wherein the selected RAN interface policy type is associated with a conflict resolution strategy.

Example 8: The RIC of example 7, wherein the selected RAN interface policy type comprises an A1 policy type and the selected RAN interface policy type is associated with an A1 type definition.

Example 9: The RIC of any of examples 1 through 8, wherein the RAN comprises at least one interface including at least one of an A1 interface, an O1 interface, an O2 interface, and an R1 interface of the RIC.

Example 10: The RIC of any of examples 1 through 9, wherein, to determine whether the service has the conflict, the instructions further cause the processor circuitry to: determine, based on a comparison of a first policy of an application with a second policy of one of an application and a different application, whether one or more statements of the first policy contradict one or more statements of the second policy.

Example 11: The RIC of any of examples 1 through 10, wherein, to determine whether the service has the conflict, the instructions further cause the processing circuitry to: determine, based on a comparison of a first policy of the application with a second policy of the application or a different application, whether one or more statements of the first policy overlap in scope with one or more statements of the second policy.

Example 12: The RIC of any of examples 1 through 11, wherein, to determine whether the service has the conflict, the instructions further cause the processing circuitry to: determine whether one or more statements within a policy of the application exceeds a limit of a target of the policy.

Example 13: The RIC of example 12, wherein the policy comprises a first policy, and wherein the instructions further cause the processing circuitry to: receive, from a second application of the one or more applications, a request for conflict guidance for an implementation of a second policy; determine whether the second policy has the conflict; and provide a guidance response to the application based on the determination whether the second policy has the conflict.

Example 14: The RIC of example 13, wherein the guidance response comprises one or more of: the indication of the conflict and whether the second policy creates the conflict; one or more recommendations to resolve the conflict; and the conflict information identifying a cause of the conflict.

Example 15: The RIC of any of examples 1 through 14, wherein to determine whether the service has the conflict, the instructions further cause the processor circuitry to determine whether the service has at least one of a direct conflict, an indirect conflict, or an implicit conflict.

Example 16: A method includes displaying a plurality of policies for an interface service of a radio access network (RAN); receiving an indication of selection of a conflict resolution strategy for a selected RAN interface policy type; determining whether the interface service of the RAN has a conflict based on the selected conflict resolution strategy for the selected RAN interface policy type; when the interface service does not have the conflict, accepting the selected conflict resolution strategy for the selected RAN interface policy type and displaying an indication of the selected conflict resolution strategy for the selected RAN interface policy type; and based on the selected conflict resolution strategy for the selected RAN interface policy type, modifying a configuration of the RAN.

Example 17: The method of example 16, further includes when the interface service has the conflict, do not accept the selected conflict resolution strategy for the selected RAN interface policy type and display at least one of an indication of the conflict and conflict information.

Example 18: The method of any of examples 16 and 17, wherein the indication of the selection of the conflict resolution strategy is received from a user by a user interface of a non-real-time (RT) Radio Access Network Intelligent Controller (RIC).

Example 19: Non-transitory computer-readable storage media comprises instructions that, when executed, cause one or more processors of a Radio Access Network Intelligent Controller (RIC) for managing non-real time events of a radio access network (RAN) to: display a plurality of policies for an interface service of the RAN; receive an indication of selection of a conflict resolution strategy for a selected RAN interface policy type; determine whether the interface service of the RAN has a conflict based on the selected conflict resolution strategy for the selected RAN interface policy type; when the interface service does not have the conflict, accept the selected conflict resolution strategy for the selected RAN interface policy type and display an indication of the selected conflict resolution strategy for the selected RAN interface policy type; and based on the selected conflict resolution strategy for the selected RAN interface policy type, modify a configuration of the RAN.

Example 20: The non-transitory computer-readable storage media of example 19, wherein the selected RAN interface policy type is associated with a conflict resolution strategy.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a compact disc read only memory (CD-ROM), a floppy disk, a cassette, magnetic media, optical media, or other computer-readable storage media. The term "computer-readable storage media" refers to physical storage media, and not signals, carrier waves, or other transient media.

What is claimed is:

1. A Radio Access Network Intelligent Controller (RIC) for a radio access network (RAN), the RIC comprising:
   processing circuitry; and
   a memory coupled to the processing circuitry, the memory storing instructions, when executed, to cause the processing circuitry to:
      display a plurality of policies for an interface service of the RAN organized by a plurality of RAN interface policy types, wherein the interface service is an interface service for one of an AI interface, an O1 interface, or an O2 interface;
      receive an indication of selection of a conflict resolution strategy for a selected RAN interface policy type of the plurality of RAN interface policy types;
      determine whether the interface service of the RAN has a conflict based on the selected conflict resolution strategy for the selected RAN interface policy type;
      when the interface service has the conflict and the selected conflict resolution strategy is priority-based overriding, display respective priorities for policy conflict management of a plurality of applications and an indication of at least one of the plurality of applications causing the conflict; and
      based on the selected conflict resolution strategy for the selected RAN interface policy type, modify a configuration of the RAN.

2. The RIC of claim 1, further comprising:
   when the interface service has the conflict, do not accept the selected conflict resolution strategy for the selected RAN interface policy type.

3. The RIC of claim 1, wherein the indication of the selection of the conflict resolution strategy is received from a user by a user interface of the RIC.

4. The RIC of claim 1, wherein the selected conflict resolution strategy comprises one of allow, first come first served, or priority-based overriding.

5. The RIC of claim 1, wherein when the selected conflict resolution strategy is priority-based overriding, the instructions, when executed, further cause the processing circuitry to receive a new priority for at least one of the plurality of applications.

6. The RIC of claim 1, wherein the selected RAN interface policy type is associated with a conflict resolution strategy.

7. The RIC of claim 6, wherein the selected RAN interface policy type comprises an AI policy type and the selected RAN interface policy type is associated with an A1 type definition.

8. The RIC of claim 1, wherein the RAN comprises at least one interface including at least one of the A1 interface, the O1 interface, the O2 interface, or an R1 interface of the RIC.

9. The RIC of claim 1, wherein, to determine whether the interface service has the conflict, the instructions further cause the processing circuitry to:
   determine, based on a comparison of a first policy of an application with a second policy of one of an application and a different application, whether one or more statements of the first policy contradict one or more statements of the second policy.

10. The RIC of claim 1, wherein, to determine whether the interface service has the conflict, the instructions further cause the processing circuitry to:
   determine, based on a comparison of a first policy of an application with a second policy of the application or a different application, whether one or more statements of the first policy overlap in scope with one or more statements of the second policy.

11. The RIC of claim 1, wherein, to determine whether the interface service has the conflict, the instructions further cause the processing circuitry to:
   determine whether one or more statements within a policy of an application exceeds a limit of a target of the policy.

12. The RIC of claim 11, wherein the policy comprises a first policy, and wherein the instructions further cause the processing circuitry to:
   receive, from a second application, a request for conflict guidance for an implementation of a second policy;
   determine whether the second policy has the conflict; and
   provide a guidance response to the application based on the determination whether the second policy has the conflict.

13. The RIC of claim 12, wherein the guidance response comprises one or more of:
   the indication of the conflict and whether the second policy creates the conflict;
   one or more recommendations to resolve the conflict; and
   the conflict information identifying a cause of the conflict.

14. The RIC of claim 1, wherein to determine whether the interface service has the conflict, the instructions further cause the processing circuitry to determine whether the interface service has at least one of a direct conflict, an indirect conflict, or an implicit conflict.

15. A method comprising:
   displaying a plurality of policies for an interface service of a radio access network (RAN) organized by a plurality of RAN interface policy types, wherein the interface service is an interface service for one of an AI interface, an O1 interface, or an O2 interface;
   receiving an indication of selection of a conflict resolution strategy for a selected RAN interface policy type of the plurality of RAN interface policy types;
   determining whether the interface service of the RAN has a conflict based on the selected conflict resolution strategy for the selected RAN interface policy type;
   when the interface service has the conflict and the selected conflict resolution strategy is priority-based overriding, displaying respective priorities of a plurality of applications for policy conflict management and an indication of at least one of the plurality of applications causing the conflict; and
   based on the selected conflict resolution strategy for the selected RAN interface policy type, modifying a configuration of the RAN.

16. The method of claim 15, further comprising:

when the interface service has the conflict, do not accept the selected conflict resolution strategy for the selected RAN interface policy type.

17. The method of claim 15, wherein the indication of the selection of the conflict resolution strategy is received from a user by a user interface of a non-real-time (RT) Radio Access Network Intelligent Controller (RIC).

18. A non-transitory computer-readable storage media comprising instructions that, when executed, cause one or more processors of a Radio Access Network Intelligent Controller (RIC) for managing non-real time events of a radio access network (RAN) to: display a plurality of policies for an interface service of the RAN organized by a plurality of RAN interface policy types, wherein the inter-face service is an interface service for one of an AI interface, an 01 interface, or an 02 interface; receive an indication of selection of a conflict resolution strategy for a selected RAN interface policy type of the plurality of RAN interface policy types; determine whether the interface service of the RAN has a conflict based on the selected conflict resolution strategy for the selected RAN interface policy type; when the interface service has the conflict and the selected conflict resolution strategy is priority-based overriding, display respective priorities of a plurality of applications for policy conflict management and an indication of at least one of the plurality of applications causing the conflict; and based on the selected conflict resolution strategy for the selected RAN interface policy type, modify a configuration of the RAN.

19. The non-transitory computer-readable storage media of claim 18, wherein the selected RAN interface policy type is associated with a conflict resolution strategy.

\* \* \* \* \*